United States Patent [19]

Dwyer

[11] Patent Number: 4,769,772
[45] Date of Patent: Sep. 6, 1988

[54] AUTOMATED QUERY OPTIMIZATION METHOD USING BOTH GLOBAL AND PARALLEL LOCAL OPTIMIZATIONS FOR MATERIALIZATION ACCESS PLANNING FOR DISTRIBUTED DATABASES

[75] Inventor: Patricia A. Dwyer, St. Paul, Minn.

[73] Assignee: Honeywell Bull, Inc., Minneapolis, Minn.

[21] Appl. No.: 706,702

[22] Filed: Feb. 28, 1985

[51] Int. Cl.[4] ........................ G06F 15/16; G06F 15/40
[52] U.S. Cl. .................................... 364/300; 364/200
[58] Field of Search ... 364/200 MS File, 900 MS File, 364/300

[56] References Cited

U.S. PATENT DOCUMENTS

| | | | |
|---|---|---|---|
| 4,430,699 | 2/1984 | Segarra et al. | 364/200 |
| 4,432,057 | 2/1984 | Daniell et al. | 364/300 |
| 4,464,650 | 8/1984 | Eastman | 340/347 DD |
| 4,479,196 | 10/1984 | Ferrer et al. | 364/900 |
| 4,497,039 | 1/1985 | Kitakami et al. | 364/900 |
| 4,499,553 | 2/1985 | Dickinson et al. | 364/300 |
| 4,500,960 | 2/1985 | Babecki et al. | 364/200 |
| 4,506,326 | 3/1985 | Shaw et al. | 364/300 |
| 4,513,390 | 4/1985 | Walter et al. | 364/900 |
| 4,531,186 | 7/1985 | Knapman | 364/300 |
| 4,543,630 | 9/1985 | Neches | 364/200 |
| 4,553,222 | 11/1985 | Kurland et al. | 364/900 |
| 4,604,686 | 8/1986 | Reiter et al. | 364/200 |
| 4,606,002 | 8/1986 | Waisman et al. | 364/200 |
| 4,631,673 | 12/1986 | Haas et al. | 364/300 |
| 4,635,189 | 1/1987 | Kendall | 364/200 |
| 4,644,471 | 2/1987 | Kojima et al. | 364/300 |
| 4,648,036 | 3/1987 | Gallant | 364/300 |

Primary Examiner—Archie E. Williams, Jr.
Attorney, Agent, or Firm—William A. Linnell; George Grayson; John S. Solakian

[57] ABSTRACT

In a Distributed Database System (DDS), database management and transaction management are extended to a distributed environment among a plurality of local sites which each have transaction server, file server, and data storage facilities. The Materialization and Access Planning (MAP) method of a distributed query, update, or transaction is an important part of the processing of the query, update, or transaction. Materialization and access planning results in a strategy for processing a query, update, or transaction in the distributed database management system (DSDBMS). Materialization consists of selecting data copies used to process the query, update, or transaction. This step is necessary since data may be stored at more than one site (i.e., computer) on the network. Access planing consists of choosing the execution order of operations and the actual execution site of each operation. Three access planning methods are used: General (Response), General (Total) and Initial Feasible Solution (IFS). For a distributed query, General (Response) and General (Total) decrease the communication cost and increase the local processing costs as compared to the IFS.

18 Claims, 5 Drawing Sheets

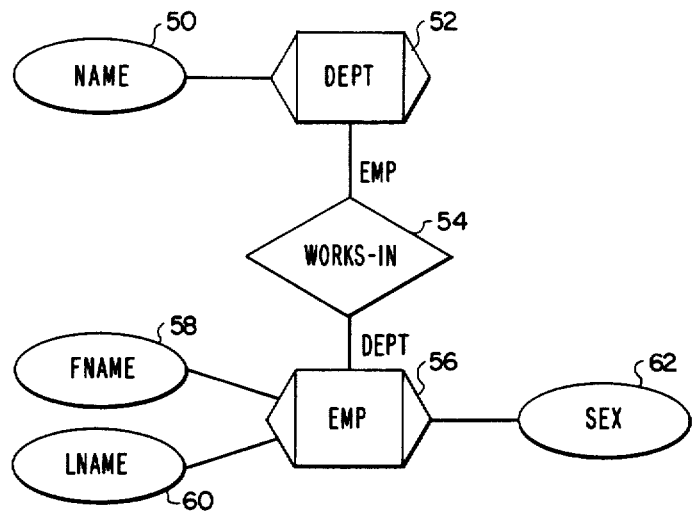
Fig. 4.
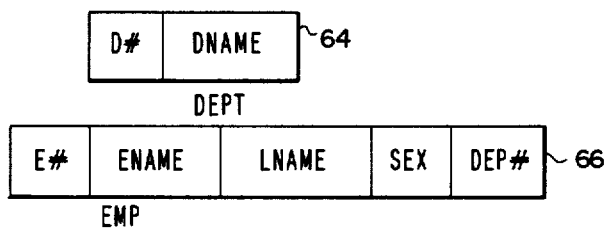
Fig. 5.
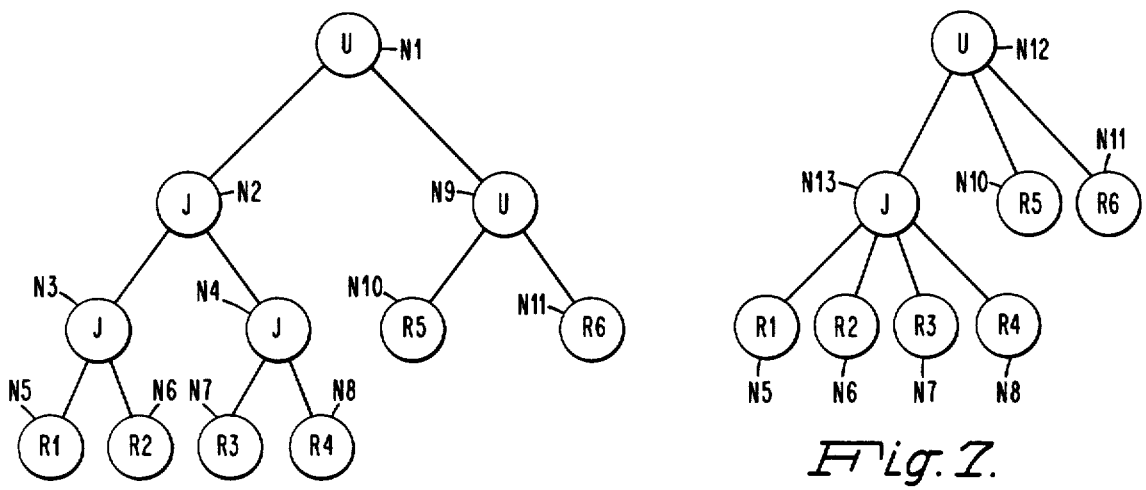
Fig. 6.
Fig. 7.

AUTOMATED QUERY OPTIMIZATION METHOD USING BOTH GLOBAL AND PARALLEL LOCAL OPTIMIZATIONS FOR MATERIALIZATION ACCESS PLANNING FOR DISTRIBUTED DATABASES

BACKGROUND OF THE INVENTION

1. Field of the Invention

This invention relates to computer database systems; and more specifically to a method for optimizing queries, updates and transactions in a distributed database system.

2. Description of the Prior Art

Modern database systems are frequently distributed, meaning that the data is kept at widely dispersed locations. Several different computers control access to different parts of the data, and several computers are used to interface with users at different locations; these may or may not be the same machines that access the data itself. The various computers are connected by communications links, and it is normal for these links to be relatively low speed, compared with, say, the speed at which a file can be read off of a disk. The consequence of this assumption about communication is that the transfer of data between computers becomes a bottleneck, and most of the issues unique to distributed systems concern ways of dealing with this bottleneck.

A distributed database consists of a number of sites, each of which is a computer and a facility for storing data. In general, each site has both a transaction server to process queries and updates generated by a user, and a file server to handle data access. However, it is possible that one of these two functions is missing at any particular site, and often one computer will act as both the transaction and file server.

A database is composed of "items", which are individually lockable pieces of data. It is a possibility that some items are duplicated, in the sense that they appear at two or more sites. The reason for doing so is that accesses to frequently read items may be sped up if the item is available at the same site that processed the read request. Further, the redundant storage of items makes it less likely that the item will be lost in a crash. The penalty is that more messages must be sent to update or lock a duplicated item than an item that appears only once.

Some or all pairs of sites are connected by links, over which messages can be sent and data transmitted. Based on the technology of the early 1980's, the time to send even a short message between geographically distributed sites is nontrivial, say 0.1 seconds, and the rate at which data can be transmitted across a link is not too great, perhaps around 10,000 bytes per second or less. The tenth of a second overhead to send a message represents the time for the two processors connected by a link to execute the protocol necessary for one to send a message, assured that the other will receive it and know what to do with it. The shipping rate for data is limited by the speed at which a processor can send or receive data, or the bandwidth of the link (rate at which data can be transmitted across the line) or both.

A prior art system which optimizes queries in a distributed database system is System R*. System R* is the experimental extension of System R to the distributed environment. Like its parent, it performs optimization in an exhaustive way, confident that the cost of considering many strategies will pay off in lower execution costs for queries, especially for queries that are compiled and used many times.

The optimization method of System R* applies to an algebraic query, where the expression to be optimized represents the query applied to logical relations, which in turn are expressed in terms of physical relations. The operators assumed to appear in the query are the usual select, project, join and union, plus a new operator choice, which represents the ability of the system to choose any of the identical, replicated copies of a given relation. The System R* method of optimization considers all ways to evaluate the nodes of the compacted tree, taking into account 1. the various orders in which an operator like union or join of many relations can be performed as a sequence of binary steps,
2. the various sites at which each node of the tree could have its result computed, and
3. several different ways that the join could be computed.

When the System R* method considers each of the options listed above, it must evaluate the cost of these methods. The actual cost function used in System R* is quite complex, it takes account of the computation cost at a site as well as the transmission cost between sites. Further, the System R* method for optimizing distributed queries exhaustively considers all possible strategies for query evaluation that can be built from a fixed collection of options. The System R* is described in greater detail in *Principles of Database Systems*, by Jeffrey D. Ullman, Computer Science Press, 1982, which is incorporated herein by reference.

The System R* method has the disadvantage that the computation time spent in determining an optimum query execution strategy may exceed the time to be saved by execution of the optimal strategy. Further, the System R* method requires the site at which optimization is being performed to have access to sufficient information about the various sites so that the computation cost at the sites can be calculated. This site information has to be transmitted to the optimization site and must be updated as conditions at the various sites change. In addition, the System R* optimization method requires that all, global and local, optimization must be performed before any execution of the query can be started.

OBJECTS OF THE INVENTION

Accordingly, it is an object of the present invention to provide a distributed database query optimization method that allows some of the optimization to be done locally.

It is another object of the present invention to provide a distributed database query optimization method that separates optimization into global and local processes allowing multiple local optimizations to be done in parallel thereby decreasing the elapsed optimization time.

It is a further object of the present invention to provide a distributed database query optimization method which has a less exhaustive global optimization process and allows some of the optimization to be done locally.

It is a yet further object of the present invention to provide a distributed database query optimization method which does not require local database parameters to be present at all sites which perform query optimization.

It is a still further object of the present invention to provide a distributed database query optimization method which performs local optimization at the local sites using current local database parameters.

This invention is pointed out with particularly in the appended claims. An understanding of the above and further objects and advantages of this invention can be obtained by referring to the following description taken in conjunction with the drawings.

SUMMARY OF THE INVENTION

A method for determining an optimal execution strategy for a request comprising query, update or transaction operations on a distributed database system having multiple data sites interconnected by communication lines in which optimization is done by inputting the request in the form of a compacted tree having leaf and non-leaf nodes and then for each node in the compacted tree: (1) doing materialization planning to choose the data sites from which data is to be accessed; (2) doing local process planning to determine which operations can be processed locally at each site determined by materialization planning and estimate parameters of resultant data from the local operations; (3) doing non-local process planning to determine strategy for remaining operations which can not be performed locally without transmission of data between sites; and then (4) building the requests for each data site in the distributed database system at which data is processed by access or manipulation. After performing the optimization, the built requests are output to a process that coordinates the execution of the built requests at sites within the distributed database system.

BRIEF DESCRIPTION OF THE DRAWINGS

The manner in which the method of the present invention is performed can best be understood in light of the following detailed description together with the accompanying drawings in which like reference numbers identify like elements in the several figures and in which:

FIG. 4 is a diagram of an example Entry-Category-Relationship (ECR) schema.

FIG. 5 is a diagram of an example relational schema corresponding to the example ECR schema of FIG. 4.

FIG. 6 is a diagram of an example binary tree.

FIG. 7 is a compacted tree corresponding to the binary tree of FIG. 6.

DESCRIPTION OF THE PREFERRED EMBODIMENT

Figure 1:
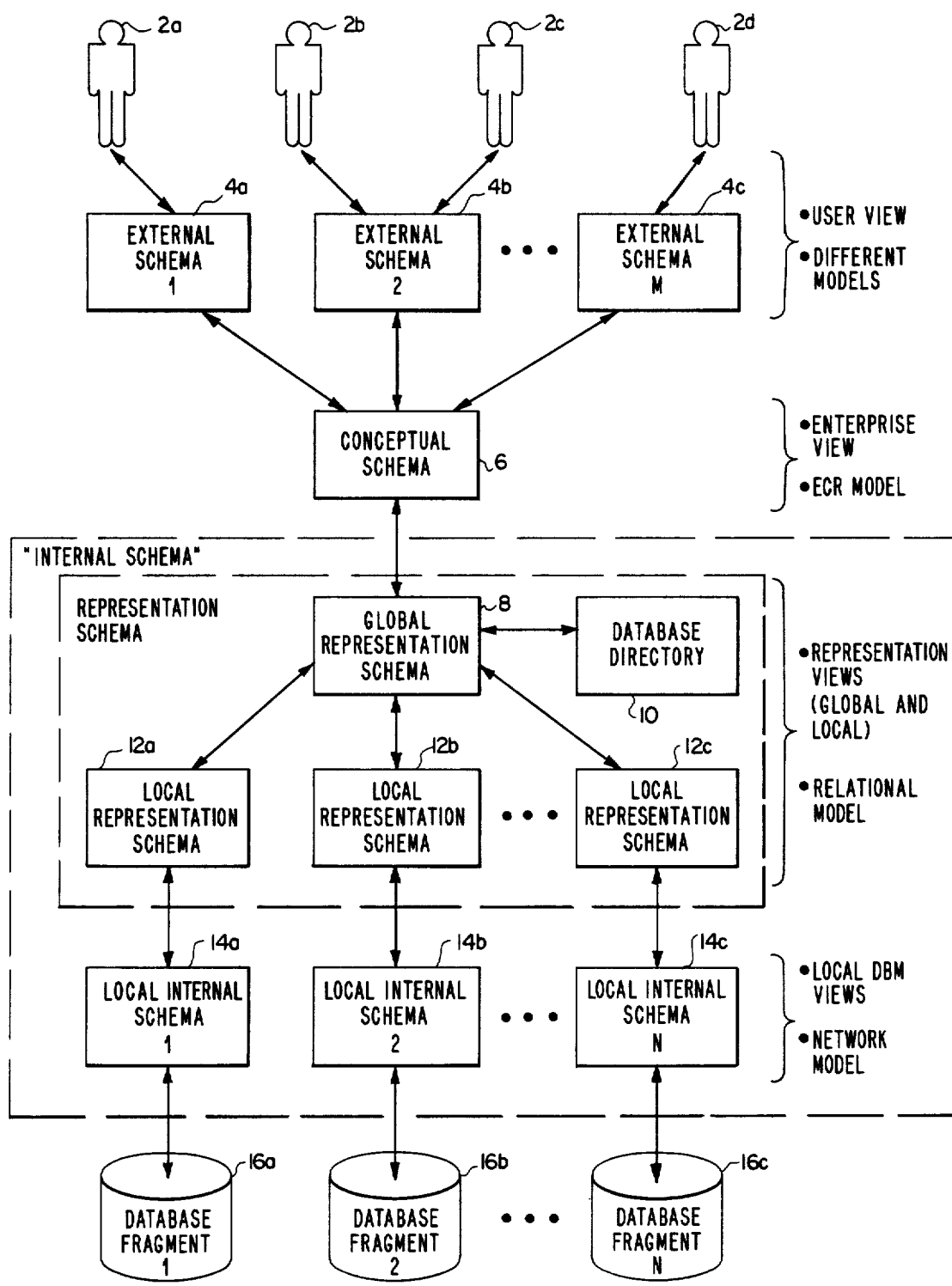
FIG. 1 is a diagram of the five schema architecture of the distributed data system.

In a Distributed Database System (DDS), database management and transaction management are extended to a distributed environment.

This distributed environment may provide multiple user interfaces including non-procedural query interfaces and programming language interfaces; distributed database processing; an active Data Dictionary/Directory (DD/D) system that may be distributed; multiple database managers; and a comprehensive set of user support facilities.

The Materialization and Access Planning (MAP) process for a distributed query, update, or transaction is an important part of the processing of the query, update, or transaction. Materialization and access planning results in a strategy for processing a query, update, or transaction in the Distributed Database Management System (DDBMS). Materialization consists of selecting data copies used to process the query, update, or transaction. This step is necessary since data may be stored at more than one site (i.e., computer) on the network. Access planning consists of choosing the execution order of operations and the actual execution site of each operation.

The MAP process of the preferred embodiment selects a good materialization for all data in the query, update, or transaction. Three different access planning methods are provided, GENERAL (RESPONSE), GENERAL (TOTAL), and Initial Feasible Solution (IFS). GENERAL (RESPONSE) and GENERAL (TOTAL) build optimal execution strategies using a cost function of the communications costs. Local processing costs are not considered. GENERAL (RESPONSE) builds an execution strategy with minimum response time, the time elapsed between the start of the first transmission and the time at which the result arrives at the required computer. GENERAL (TOTAL) builds an execution strategy with minimum total time, the sum of the time of all transmissions. IFS does not perform any optimization.

The IFS solution is optimal when small amounts of data are required for transmission by the user request. The IFS solution always has the smallest number of messages; GENERAL (RESPONSE) and GENERAL (TOTAL) consider solutions with additional messages that result in additional local processing in an attempt to minimize the amount of data transmitted, i.e., these solutions have more messages than the IFS solution, but the sum of the size of the messages is smaller. When small amounts of data in the database are being accessed, the solution of IFS is optimal.

Further performance improvements can be obtained by improving the cost function used by GENERAL (RESPONSE) and GENERAL (TOTAL). The current function only includes communications costs. The communications costs were assumed to be a linear function of the message size, and the same cost function was used for sending a message between any two sites. Local processing costs could be included in the cost function. In addition, the load and capacity of each site are very important to overall performance. For the DDS system environment in which the sites are locally distributed, these factors are not negligible compared to communications. For geographically distributed environments, they will be much less important.

GENERAL (RESPONSE) should be used when optimal user response time is the goal of the system; GENERAL (TOTAL) should be used when optimal total communications time is the goal of the system. The choice between GENERAL (RESPONSE) and GENERAL (TOTAL) depends on the particular system applications and goals. The cost functions used by GENERAL (RESPONSE) and GENERAL (TOTAL) can be tuned for each system. The communications cost function can be determined from system performance data. For a geographically distributed system, this function may be sufficient. In a locally distributed system, the inclusion of local processing costs, load, and capacity of the sites should be considered. The MAP method of the preferred embodiment is also described in "A Study of Materialization and Access Planning", by P. A. Dwyer, CSC-84-10: 8212, Honeywell Inc. Computer Sciences Center, February 1984, which is incorporated herein by reference.

The Distributed Database System Architecture

In this section, the information architecture, system architecture, and transaction management of DDS are described. The information architecture describes how information is to be conceptually modeled, represented, and allocated. The system architecture describes processor characteristics, processor locations, communications, and system level protocols for distributed execution. Transaction management describes the processing steps required for a query, update, or transaction using the information and system architectures.

Information Architecture

The ANSI/SPARC 3-schema architecture described in "The ANSI/X3/SPARC Report of the Study Group on Data Base Management Systems", edited by A. Klug and D. Tsichritzis, AFIPS Press, 1977, which is incorporated herein by reference, a database system is extended in DDS to provide for a distributed system. In the 3-schema architecture, the three levels of database description are the conceptual schema, the external schemas, and the internal schema. The conceptual schema is a description of the portion of the world being modeled by the database. An external schema is a consistent and logical subset of the conceptual schema; it is the description of a user view of the database. The internal schema describes the system representation of the database.

This 3-schema proposal for centralized DBMSs has been extended to the 5-schema architecture in DDS as illustrated in FIG. 1 as described in "Transaction Processing in a Multi-schema Distributed Database Testbed System" by C. C. Devor, R. Elmasri and S. Rahimi, HR-81-253: 17-38, Honeywell Corporate Computer Sciences Center, February 1981, which is incorporated herein by reference. The external schemas 4a, 4b and 4c are descriptions of the users 2a, 2b, 2c and 2d views, and serve as the user interface. The conceptual schema 6 is a semantic description of the total distributed database. The global representation schema 8 is a synthetic representation of the total database content. The local representation schemas 12a, 12b and 12c are syntactic descriptions of the data resident at specific nodes. The local internal schemas 14a, 14b and 14c are the local database management system implementations that manage the database fragments 16a, 16b and 16c.

In DDS, the global representation schema 8 and the local representation schemas 12a, 12b and 12c are described with the relational model, as described in "A Relational Model for Large Shared Data Banks" by E. F. Codd, *Communications of the ACM*, Vol. 13, No. 6, June 1970, which is incorporated herein by reference, because the relational data model is convenient for describing the distribution and replication of data across the sites of the DDBMS, and data described in this model can be accessed using a nonprocedural set oriented data manipulation language as opposed to a procedural, record at a time data manipulation language. In the DDS implementation of the preferred embodiment, the local internal schemas 14a, 14b and 14c use the network model because the local database management systems are IDS/II systems described in *GCOS 6 IDS-/II User's Guide*, Honeywell Information Systems Inc., Waltham, Mass., November 1978, which is incorporated herein by reference. Other DBMSs with possibly different local internal schemas can be used.

System Architecture

Figure 2:
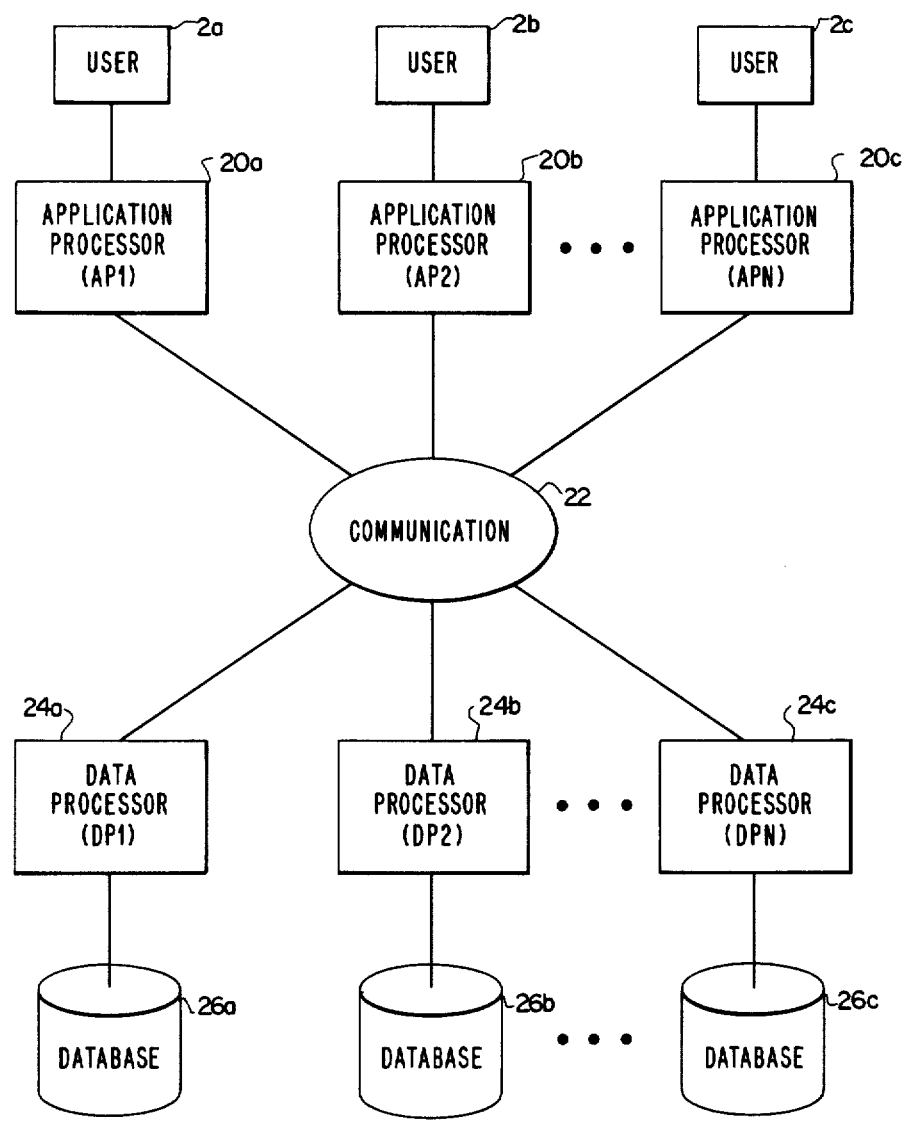
FIG. 2 is a diagram of a distributed data system logical architecture showing data processors and application processors connected by a communications network.

DDS consists of a set of Application Processors (APs) 20a, 20b and 20c and Data Processors (DPs) 24a, 24b and 24c connected by a communications network 22 (See FIG. 2). The APs control the interface to the users 24a, 24b and 24c and all transaction management, and the DPs perform the data management of the databases 26a, 26b and 26c. DDS of the preferred embodiment is implemented on Honeywell Level 6 computers 24a, 24b and 24c with the GCOS6 MOD400 operating system. Each Level 6 computer 24a, 24b and 24c can support zero or more APs and/or zero or more DPs. Additional details of the DDS system architecture can be found in "Implementing the Distributed Database Testbed System (DDTS) in a Multi-computer GCOS 6/MOD Environment", by C. C. Devor, M. Spinrad, P. A. Tovo, K. Koeneman, and M. Smith, HR-81-264: 17–38, Honeywell Corporate Computer Sciences Center, June 1981, which is incorporated herein by reference.

Transaction Management

Figure 3:
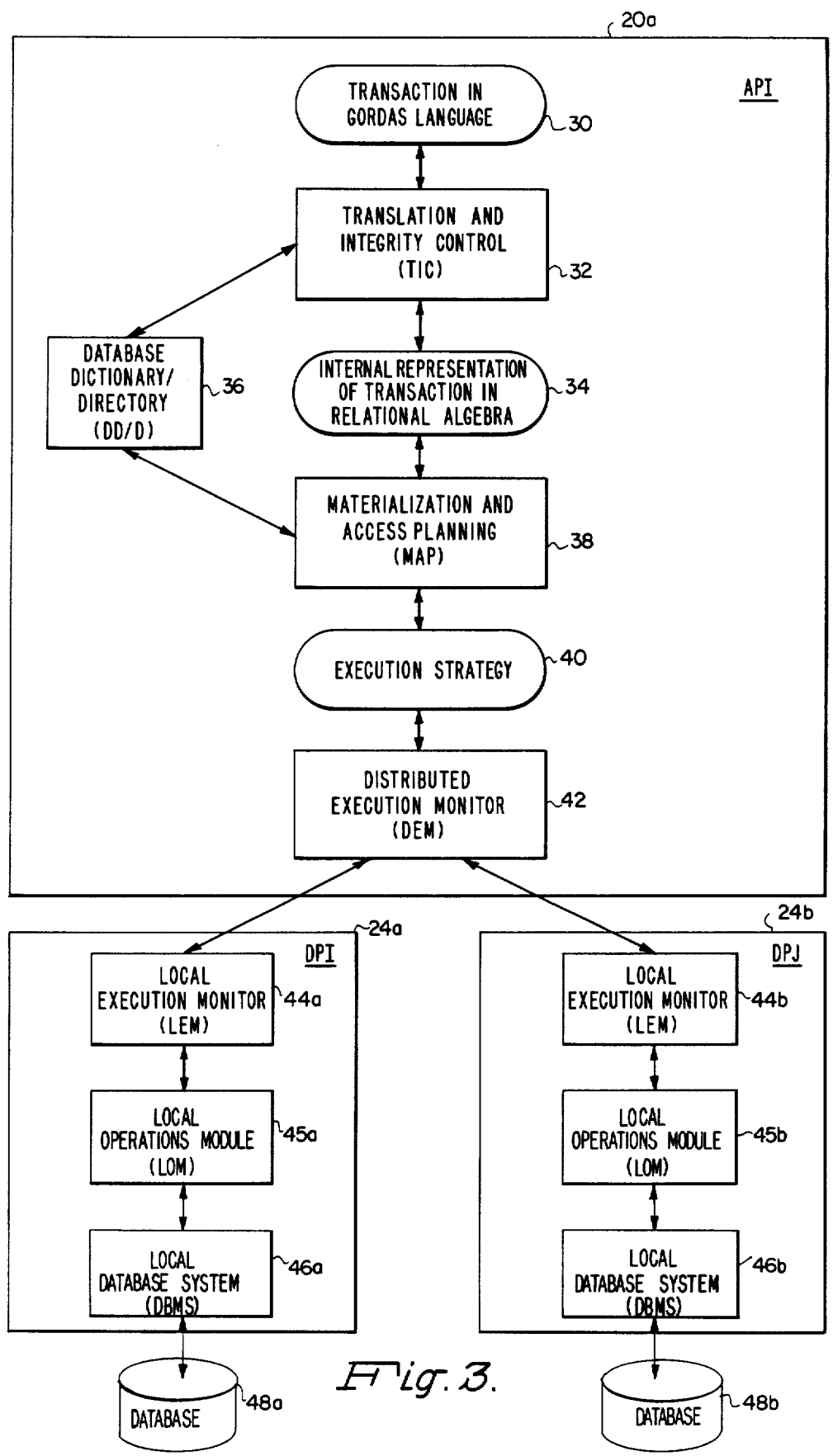
FIG. 3 is a diagram of the steps associated with processing a distributed data system query, update or transaction.

The user's view of DDS is built around the concepts of a query, an update, or a transaction. The steps involved in processing a query, an update, or a transaction are illustrated in FIG. 3. A query, an update, and a transaction in DDS are defined in the GORDAS high-level data manipulation and description language as described in "GORDAS: A Data Definition, Query and Update Language for the Entity-Category-Relationship Model of Data", by R. Elmasri, HR-81-250: 17–38, Honeywell Corporate Computer Sciences Center, January 1981, which is incorporated herein by reference. GORDAS (Graph ORiented DAta Selection Language) is a language for graph-oriented data models such as the Entity-Relationship (ER) model as described in "The Entity-Relationship Model: Towards a Unified View of Data", by P. P-S. Chen, *ACM Transactions on Database Systems*, Volumn 1, Number 1, March 1976, which is incorporated herein by reference and the Entity-Category-Relationship (ECR) model described in "The Entity-Category-Relationship Model of Data" by J. A. Weeldreyer, HR-80-250: 17–38, Honeywell Corporate Computer Sciences Center, March 1980, which is incorporated herein by reference. A transaction expressed in GORDAS 30 is simply more than one GORDAS query or update to be processed as a group. Currently, GORDAS transactions cannot contain control constructs such as, IF-THEN-ELSE-ENDIF and DO-WHILE. A query or an update in GORDAS 30 is translated to a single cluster tree that is an internal nonprocedural representation of the query or update (see FIG. 3). A transaction expressed in GORDAS 30 is translated to a list of cluster trees 34 by Transaction and Integrity Control (TIC) 32; there is one cluster tree per query or update in the transaction. The cluster tree operators operate on the data described by the global representation schema.

After translation of a query, an update, or a transaction, materialization and access planning 38 take place. For each query or update, a materialization is chosen and an execution strategy 40 is built. The execution strategy is expressed in terms of the local representation schemas. Both TIC 32 and MPA 38 use information from the database dictionary directory (DD/D) 36 to perform their functions.

A Distributed Execution Monitor (DEM) 42 coordinates the processing of the execution strategy. The DEM 42 sends commands that specify the local relational operations to one or more Local Execution Monitors (LEMs) 44a, 44a for local optimization and execution. The DEM 42 coordinates synchronization among the commands, and is responsible for commitment and concurrency control of updates at multiple sites. The local relational operators are translated to the operations on the local DBMS 46a and 46b by the Local Operations Module (LOM) 45a and 45b and are executed against the databases 48a, 48b.

Compiling and saving a transaction for later execution offers an alternative scheme. "Compilation" consists of processing the transaction through materialization and access planning 38. At this point the operations are expressed in terms of the local representation schemas. They are stored at the local nodes for later execution. At execution time the DEM 42 sends commands to the local execution monitors 44a and 44b specifying which stored operations to execute.

The MAP 38 System Environment

This section presents the system environment of the DDS that is relevant to the MAP 38 process. The five areas discussed are the internal data model, the type of data distribution, the level of distribution transparency, the usage characteristics, and the transaction management facilities.

The Internal Data Model

In DDS, MAP 38 is applied to queries, updates, and transactions whose operations are expressed in terms of the global representation schema. Using location information, MAP 38 produces an execution strategy that contains operations against the local representation schemas. Each Local Operations Module (LOM) 45a and 45b translates its operationss to operationss against an IDS/II schema. Both the global and local representation schemas are defined using the relational model of data.

The following terms, as defined, are used in the following description. References for these terms can be found in *Fundamentals of Data Structures*, by E. Horowitz and S. Sahni, Computer Science Press, Inc., 1967, and *An Introduction to Database Systems*, Second Edition, by D. J. Data, Addison-Wesley Publishing Company, Inc., 1977, which are incorporated herein by reference.

relation: Given a collection of sets D1, D2, ..., Dn (not necessarily distinct), R is a relation on these n sets if it is a set of ordered n-tuples <d1, d2, ..., dn> such that d1 belongs to D1, d2 belongs to D2, ..., dn belongs to Dn. Sets D1, D2, ..., Dn are the domains of R. The value n is the degree of R.

attribute: The use of a domain within a relation.

relational model of a database: A user's view of that database as a collection of time-varying, normalized relations of assorted degrees.

normalized relation: Every value in the relation, i.e., each attribute value in each tuple, is atomic (non-decomposable).

tuple: Each row of the table represents one n-tuple (or simply one tuple) of the relation.

cardinality: The number of tuples in a relation.

data sublanguage: The set of operators provided to manipulate data in relational form.

relational algebra: A collection of high level operations on relations.

retrieval or query operators: The set of operators for retrieving data in relational form.

storage or update operators: The set of operators for storing data in relational form.

relational algebra retrieval operations: selection, projection, join, division, union, intersection, difference, and extended Cartesian product.

relational algebra storage operations: insert, delete, and modify.

union-compatible relations: Relations of the same degree, n, and the jth attribute of one relation must be drawn from the same doman as the jth attribute of the other relation ($1 <= j <= n$).

union: The union of two union-compatible relations A and B, A UNION B, is the set of all tuples t belonging to either A or B (or both).

intersection: The intersection of two union-compatible relations A and B, A INTERSECT B, is the set of all tuples t belonging to both A and B.

difference: The difference between two union compatible relations A and B (in that order), A MINUS B, is the set of all tuples t belonging to A and not to B.

extended Cartesian product: The extended Cartesian product of two relations A and B, A TIMES B, is the set of all tuples t such that t is the concatenation of a tuple a belonging to A and a tuple b belonging to B. The concatenation of a tuple $a=(a1, \ldots, am)$ and a tuple $b=(bm+1, \ldots, bm+n)$, in that order, is the tuple $t=(a1, \ldots, am, bm+1, \ldots, bm+n)$.

selection: select is an operator for constructing a horizontal subset of a relation, i.e., that subset of tuples within a relation for which a specified predicate is satisfied. The predicate is expressed as a Boolean combination of terms, each term being a simple comparison that can be established as true or false for a given tuple by inspecting that tuple in isolation.

projection: project is an operator for constructing a vertical subset of a relation, i.e., a subset obtained by selecting specified attributes and eliminating others (and also eliminating duplicate tuples within the attributes selected).

join: The equi-join of relation A on attribute X with relation B on attribute Y, join A and B where $X=Y$, is the set of all tuples t such that t is a concatenation of a tuple a belonging to A and a tuple b belonging to B, where $x=y$ (x being the X component of a and y the Y component of b). We may define joins for each of the other comparison operators $>$, $<>$, $>=$, $<$, and $<=$.

division: An operation between a binary relation (the dividend) and a unary relation (the divisor) which produces a unary relation (the quotient) as its result. Let the divident A have attributes X and Y and let the divisor B have attribute Z, and let Y and Z be defined on the same underlying domain. The the divide operation, divide A by B over Y and Z, produces a quotient defined on the same domain as X; as value x will appear in the quotient if and only if the pair $<x,y>$ appears in A for all values y appearing in B.

tree: A finite set of one or more nodes such that: (i) there is a specially designated node called the root; (ii) the remaining nodes are partitioned into $n >= 0$ disjoint sets T1, ..., Tn where each of these sets is a tree. T1, ..., Tn are called the subtrees of the root.

node: The item of information plus the branches to other items.

degree: The number of subtrees of a node.

leaf or terminal nodes: Nodes that have degree zero.

non-leaf or non-terminal nodes: Nodes that have degree greater than zero.

children: The roots of the subtrees of a node, X, are the children of X. X is that parent of its children.

degree of a tree: The maximum degree of the nodes in the tree.

binary tree: A finite set of nodes which is either empty or consists of a root and two disjoint binary trees called the left subtree and the right subtree.

FIG. 6 is an example binary tree having nodes N1 through N11. Node N1 is the root node of the tree and nodes N2 through N8 compose the left subtree and nodes N9 through N11 compose the right subtree. Nodes N2 and N9 are the children of node N1 and nodes N3 and N4 are the children of N2. Nodes N1, N2-N4 and N9 are non-leaf or non-terminal nodes and nodes N5-N8, N10 and N11 are leaf or terminal nodes. Nodes N1 and N9 are union operators and nodes N2, N3 and N4 are join operators.

FIG. 7 is a compacted tree corresponding to the binary tree of FIG. 6. A tree is compacted by combining nodes having the same associative and commutative binary operator into a single node, provided the nodes being combined form a tree, with no intervening nodes labeled by other operators. The binary operators, union and join, are associative and commutative, so this rule applies to each of them. A tree of nodes labeled by just one of these binary operators is called a cluster. All the nodes of a cluster can be replaced by a single node, and the children of the nodes in the cluster become children of the new node. The parent of the new node is the parent of the node in the cluster that is an ancestor of all the nodes in the cluster.

In DDS, the query, update, or transaction expressed in GORDAS is translated to an internal non-procedural representation. This representation has features of both relational algebra and relational calculus. It is similar to an internal representation of SQL, the language defined for System-R as described in "Implementation of a Structured English Query Language", by M. M. Astrahan and D. D. Chamberlin, *Communications of the ACM*, Vol. 18, Nov. 10, 1975, which is incorporated herein by reference.

The internal representation that is output from the GORDAS translator and input to the MAP module is a set of cluster trees. There is a cluster tree per query or update in a transaction. For queries, there is one cluster tree input. A cluster tree represents a compacted tree of a query or update. The operations that are commutable are combined into one cluster node so that the optimization is not restricted by a given order.

The non-leaf nodes in a cluster tree are used for set operations such as UNION, INTERSECTION, and DIFFERENCE. They are also used for update operations such as DELETE, INSERT, and MODIFY. The leaves of a cluster tree represent combinations of SELECT, PROJECT, and JOIN operations. Each leaf has a variable list of the base relations involved, V (Variables), a condition on the base relations, C (Condition), and a list of attributes to project for the result, P (Project).

For example, consider the Entry-Category-Relationship (ECR) and relational schemas of FIGS. 4 and 5. The ECR schema in FIG. 4 represents the conceptual schema in FIG. 4 in DDS, and the relational schema in FIG. 5 represents the corresponding global representation schema.

FIG. 4 show 2 entities, DEPT 52 and EMP 56 in a relationship WORKS-IN 54. DEPT 52 has one attribute NAMES 50 and EMP 56 has three attributes FNAME 58, LNAME 60 and SEX 62.

FIG. 5 shows two relations, DEPT 64 and EMP 66 with the corresponding attributes.

For the following query:

get <LName, Sex> of Emp, the cluster tree, T1, contains one node:

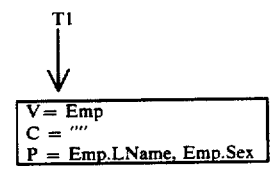

For the query:

get <LName, Sex> of Emp where FName='Mary' and Name of Dept='ISA', the following cluster tree, T2, is produced:

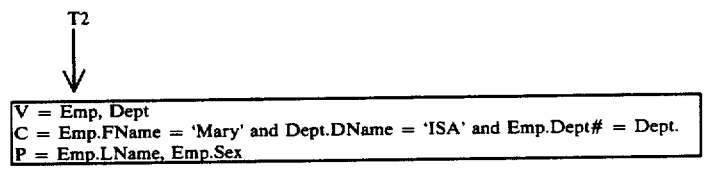

For the query:

get <LName, Sex> of Emp where FName='Mary' or Name of Dept='ISA', the following cluster tree, T3, is produced:

Since the JOIN does not commute with the UNION, an additional cluster representing this procedurality is generated.

For the update:

delete Emp where LName='Smith', the following cluster tree, T4, is produced:

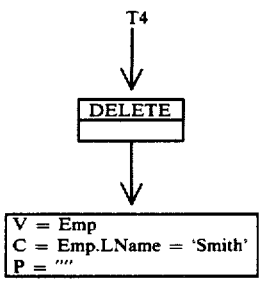

The query cluster determined what relations are to be deleted, and the delete is applied to them.

In the MAP design of the preferred embodiment, the materialization and query optimization are applied to each leaf node in a cluster tree. For cluster trees with non-leaf set nodes, the location of the final result of each leaf is used to decide where the set operation is to occur. For cluster trees with non-leaf updates, the update is performed at all sites containing the relation. The record identifiers of the records to be updated are transmitted to all sites.

The output of the MAP process is an execution strategy. This strategy contains the operations that are to be distributed among the sites involved in the execution of the query, update, or transaction, and contains commands used by the DEM to coordinate the execution. The operations to be distributed among the sites are expressed against the local representation schemas. The format is similar to the relational algebra, and includes a move command that instructs the data processor to move a temporary relation to another data processor. Each command may have preconditions, commands that must be executed previous to the execution of the command. By using the commands and the preconditions, a query tree can be built. The Brakus Normal Form (BNF) used in DDS for the commands in the execution strategy follows.

```
<network commands> ::=    { <preconditions> } ( <move command>
                          <insert command>   <execute command>
                          <modify command>   <delete command> )
<preconditions> ::= { <preconditions> } <command>
<move command> ::=    <execution site> <temporary relation name>
                      <destination>
<insert command> ::= <execution site list> <insert>
<execution site list> ::= { <execution site list> } <execution site>
<execute command> ::= <execution site> <assignment>
<modify command> ::= <execution site list> <modify>
<delete command> ::= <execution site list> <delete>
<assignment> ::= <target> <— <algebra expression>
<target> ::= <temporary relation name>
<algebra expression> ::=  <item list>   <selection>   <projection>
                          <join>   <two relation operation>
<item list> ::= { <item list> , } <value spec>
<value spec> ::= <variable>   <constant>
<selection> ::= SELECT <term> WHERE <logical expression>
<term> ::= <relation name>   '(' <algebra expression> ')'
<projection> ::= PROJECT <term> OVER <attribute spec list>
<attribute spec list> ::= { <attribute spec list> , } <attribute spec>
<attribute spec> ::=    <attribute name>   <relation name>
                        <attribute name>
<join> ::= <term> JOIN <term> WHERE <join attribute specs>
<join attribute specs> ::=    {<join attribute spec> AND}
                              <join attribute spec>
<join attribute spec> ::= <attribute spec> = <attribute spec>
<two relation operation> ::= <term> <two relation operator> <term>
<two relation operator> ::=   UNION  INTERSECT  MINUS
                              TIMES  DIVIDEBY
<logical expression> ::=   { <logical expression> (AND  OR) }
                           <logical term>
<logical term> ::= { NOT } ( <condition>
                   '(' <logical expression> ')' }
<condition> ::=   <set expr> <set comparison op> <set expr>
                  <scalar expr> <scalar comparison op> <scalar expr>
<set comparison op> ::= INCLUDES  INCLUDED_IN  =  <>
<set expr> ::= <item list>   <relation spec>
<relation spec> ::= <relation name> <attribute spec list>
<scalar comparison op> ::= =  <>  <  >  <=  >=
<scalr expr> ::= { <scalar expr> (+  —) } <term>
<term> ::= {<term> (X  /  DIV  REM) } <factor>
<factor> ::= '(' <scalar expr> ')'   <basic value>
<basic value> ::=   { <scalar function> } (<value spec>
                    <attribute spec>)
<scalar function> ::= ABS  SQRT
<insert> ::= INSERT <temporary relation name> INTO
             <base relation name>
<delete> ::= DELETE <base relation name> WHERE <logical expression>
<modify> ::=   MODIFY <attribute spec list> OF <base relation name> TO
               <scalar expr list> WHERE <logical expression>
<scalar expr list> ::= {<scalar expr list>,} <scalar expr>
```

For example, assume that Emp and Dept are at sites 1 and 2 respectively. Assume that the result site is site 2. The commands that produce the final result at the result site will be shown.

For the query:

get <LName, Sex> of Emp,
the following commands may be generated (depending on the optimization used):

| command# | site | precondition | command |
|---|---|---|---|
| 1 | 1 | — | T1<—SELECT Emp |
| 2 | 1 | 1 | T2<—PROJECT T1 OVER Emp.LName, Emp.Sex |
| 3 | 1 | 2 | MOVE T2 TO SITE 2 |

For the query:
get <LName, Sex> of Emp where FName='Mary' and Name of Dept='ISA', the following commands satisfy the query:

| command# | site | precondition | command |
|---|---|---|---|
| 1 | 1 | — | T1<—SELECT Emp WHERE Emp.FName = 'Mary' |
| 2 | 1 | 1 | MOVE T1 TO SITE 2 |
| 3 | 2 | — | T2<—SELECT Dept WHERE Dept.DName = 'ISA' |
| 4 | 2 | 2,3 | T3<—JOIN T1, T2 WHERE T1.Dep#=T2.D# |
| 5 | 2 | 4 | T4<—PROJECT T3 OVER T3.LName, T3.Sex |

For the query:
get <LName, Sex> of Emp where FName32 'Mary' or Name of Dept='ISA', the following commands satisfy the query:

| command# | site | precondition | command |
|---|---|---|---|
| 1 | 1 | — | T1<—SELECT Emp WHERE Emp.FName = 'Mary' |
| 2 | 1 | 1 | MOVE T1 TO SITE 2 |
| 3 | 1 | — | T2<—SELECT Emp |
| 4 | 1 | 3 | MOVE T2 TO SITE 2 |
| 5 | 2 | — | T3<—SELECT Dept WHERE Dept.DName = 'ISA' |
| 6 | 2 | 4,5 | T4<—JOIN T2,T3 WHERE T2.Dep#=T3.D# |
| 7 | 2 | 2 | T5<—PROJECT T1 OVER T1.LName, T1.Sex |
| 8 | 2 | 6 | T6<—PROJECT T4 OVER T4.LName, T4.Sex |
| 9 | 2 | 7,8 | T7<—T5 UNION T6 |

For the update:
delete Emp where Lname='Smith' the following commands are generated:

| command# | site | precondition | command |
|---|---|---|---|
| 1 | 1 | — | T1<—SELECT Emp WHERE Emp.LName = 'Smith' |
| 2 | 1 | 1 | T2<—PROJECT T1 OVER T1.E# |
| 3 | 1 | 1,2 | DELETE Emp WHERE Emp.E# INCLUDED IN T1 |

In summary, MAP is applied to queries, updates, and transactions expressed in terms of the relational model of data. The input to MAP is an internal SQL representation, and the output from MAP is a distributed relational algebra representation.

Type of Distribution

The type of data distribution affects the MAP process in three ways. The first is whether the data are locally or geographically distributed, the second is whether the data are replicated, and the third is whether the data are partitioned.

Both the materialization and access planning methods used in the MAP process depend on whether data are locally or geographically distributed. Materialization and access planning processes may be divided into two classes. The first class finds a minimum cost execution strategy based on a given materialization, and the second class finds a minimum cost materialization based on a given execution strategy (see "The Optimization of Query Processing in Distributed Database Systems", Ph.D. Thesis, by A. R. Hevner, Technical Report DB-80-02, Department of Computer Science, Purdue University, December 1979, and "Methods for Data Retrieval in Distributed Systems", by A. R. Hevner, Proceedings of the Second Symposium on Reliability in Distributed Software and Database Systems, Pittsburgh, July 1982, which are incorporated herein by reference). The access planning methods used in DDS are GENERAL (RESPONSE), GENERAL (TOTAL), and Initial Feasible Solution (IFS) as described in "Optimization Algorithms for Distributed Queries", by P. M. G. Apers, A. R. Hevner, and S. B. Yao, *IEEE Transactions on Software Engineering*, Vol. SE-9, No. 1, January 1, 1983, which is incorporated herein by reference. These methods belong in the first class. That is, a materialization for all data has been chosen before the access planning process builds an execution strategy.

The materialization process chooses a site for all data in the query. The method used depends on whether the data are locally or geographically distributed. In a geographically distributed environment, a "closest in distance" type of method may be used. In a locally distributed environment, distance is not a major factor, so a clustering method may be better. Both methods have been implemented on DDS.

The access planning process also depends on whether the data are locally or geographically distributed. Access planning methods try to minimize a cost function of some type. A typical cost function is given by:

cost=communication costs+processing costs.

The communication costs are a function of the amount of data transmitted on the network. The processing costs are a function of the disk access and CPU costs at each site in the network. GENERAL (RESPONSE) and GENERAL (TOTAL) assume that processing costs are negligible with respect to communication costs. As a result of this assumption, execution strategies are produced that decrease the amount of data to be sent at the expense of computation. This assumption is more valid in a geographically distributed network than in a locally distributed network. In addition, dynamic system state factors such as communication line contention and queueing delays are not considered.

The access planning method used does not depend on whether data is replicated; conversely, the materialization method used depends on whether data is replicated. This method chooses copies of data needed to execute the query, update, or transaction from the various sites. If the data are not replicated, there is no choice to make and the materialization is predetermined. The MAP process includes a simple materialization method that chooses sites based on the number of relations needed by the query, update or transaction located at each site. It chooses those sites with the most relations needed by the query, update, or transaction. This method can be easily extended to choose sites based on the number of records or bytes needed by the query, update, or transaction.

Both the materialization and the access planning methods depend on the type of data partitioning. In the relational model, data can be partitioned in five ways:

1. By schema: a schema is a description of the relations and attributes in a database. At this level of partitioning, each database resides at a single site and cannot be distributed among the sites.

2. By relation: the relations in a schema can be distributed among the sites. All rows and columns of a relation are stored in at the same site.

3. By row (horizontally): the rows (tuples) in a relation can be distributed among the sites.

4. By column (vertically): the columns (attributes) in a relation can be distributed among the sites.

5. By row and column: the rows and columns in a relation can be distributed among the sites.

The materialization and access planning methods of the preferred embodiment assume that partitioning by relation is supported.

In summary, the type of distribution supported by the proposed MAP method is geographically distributed data, with replication, and partitioning by relation.

Level of Distribution Transparency

The level in the system where knowledge of data location is available affects the MAP process. In DDS, the data location information is used to map between the global representation schema 8 and the local representation schemas 12a, 12b and 12c. At each AP 20a, 20b and 20c, the MAP process has access to the global representation schema 8, the necessary local representation schemas 12a, 12b and 12c, and the data location information.

In the preferred embodiment implementation of DDS, the global representation schema 8, the local representation schemas 12a, 12b and 12c, and the data location information are replicated at all APs 20a, 20b and 20c. Alternatively, the necessary data could be partitioned and distributed among the DPs 24a, 24b and 24c. In this case, the data used by MAP 38 must be collected from the DPs 24a, 24b and 24c before the MAP process begins.

In summary, the MAP method must have access to the global representation schema 8, the local representation schemas 12a, 12b and 12c, the mapping between them, and the location of the data in the local representation schemas 12a, 12b and 12c. This necessary data can be initialized independently of the MAP process. In the DDS of the preferred embodiment implementation, it is replicated at each AP 20a, 20b and 20c in the distributed system such that each AP has access to a local data dictionary/directory (DD/D) 36.

Usage Characteristics

The type of usage of the system affects the MAP process. In DDS, the user interfaces with the system by using the GORDAS query and update language. The user can build a transaction that consists of one or more query or update requests. In the preferred embodiment, GORDAS does not provide control constructs.

The MAP method of the preferred embodiment handles queries, updates, and transactions of one or more queries or updates. Queries are decomposed using the materialization and access planning methods. Updates are decomposed by first building an execution strategy that builds a temporary relation of the tuple identifiers of the tuples to be updated. Commands are then added to the execution strategy to move this list of tuple identifiers to each site that has the relation to be updated, and to update the relation. Transactions of one or more query or update requests are decomposed in a similar manner. Execution strategies are built for each query or update independent of one another.

An improvement would be to recognize common subexpressions in the transaction. This would reduce the number of temporary relations built.

A necessary extension to the MAP method of the preferred embodiment is to process control constructs. Work has been done on decomposing the IF-THEN-ELSE-ENDIF control construct as described in "Transaction Optimization in a Distributed Database Testbed System", by P. A. Dwyer and A. R. Hevner, Proceedings of the IEEE Seventh International Computer Software and Applications Conference, November 1983, which is incorporated herein by reference. A method was developed on DDS that handles the IF-THEN-ELSE-ENDIF, but it uses a simple access planning method. Further research is still necessary in this area.

In summary, the MAP method handles general queries and updates, but does not attempt to recognize common subexpressions or to handle control constructs in a transaction.

Transaction Management Facilities

The Reliable Transaction Processing project described in "An Overview of Reliable Transaction Processing in DDTS", by J. P. Richardson, M. D. Spinrad, and M. G. Smith, HR-82-268: 17–38, Honeywell Corporate Computer Sciences Center, November 1982, which is incorporated herein by reference addressed the problem of providing reliable, serializable, and highly available transaction execution in a distributed database management system. Site recovery logic and a commit protocol are used to provide reliability; a distributed concurrency control process is used to provide serializability; and a data replication control process is used to provide highly available transaction execution.

The MAP method is largely independent of the methods used to provide reliable transaction processing in DDS. These activities occur during transaction execution, well after the MAP process has occurred. The materialization method chooses the sites of all relations in the query or transaction. The execution strategies generated for a transaction may be stored for later execution. Each sub-query is sent to the local site where it is stored. Upon site failure, the MAP process must be reexecuted for transactions involving the failed site. Site failure information must be available to the materialization process, so that it can select new sites for use in the transaction.

The materialization process handles replicated data at the granularity of relations. For a query, if a relation is replicated at more than one site, the materialization process chooses a single copy. For an update, all copies are chosen, and the execution strategy contains an update command for each chosen copy. The data replication control method ensures that the consistency of the replicated data copies is maintained in the presence of failures.

In conclusion, the MAP process is independent of the protocols used for reliable transaction processing, but it is dependent on the location of redundant copies. The MAP process must be reexecuted if a site containing data to be accessed in an execution strategy becomes unavailable.

The Materialization and Access Planning Method

This section describes the MAP method of the preferred embodiment. The theoretical foundations of the MAP process and the design of the MAP process are presented.

Theoretical Foundations

The input to the MAP process is a cluster tree that represents a query, update, or transaction. Materialization and access planning are applied to each leaf node in a cluster tree. For cluster trees with non-leaf set nodes, the location of the final result of each leaf is used to decide where the set operation (UNION, INTERSECTION and DIFFERENCE) is to occur. For cluster trees with non-leaf update nodes, the update operation (DELETE, INSERT and MODIFY) is performed at all sites containing the relation to be updated.

The materialization process used picks the sites that have the most number of relations in the leaf node. The access planning methods used are GENERAL (RESPONSE), GENERAL (TOTAL), or Initial Feasible Solution (IFS). In the DDS of the preferred embodiment, the user specifies what method to use. IFS generates a baseline execution strategy without any optimization. GENERAL (RESPONSE) minimizes response time and GENERAL (TOTAL) minimizes total time of a query. The cost function that is minimized is a linear function of the size of the data transmitted. The response time is the time elapsed between the start of the first transmission and the time at which the result arrives at the required computer. The total time is the sum of the costs of all transmissions required.

GENERAL (RESPONSE) and GENERAL (TOTAL) require that all local processing for a query has been accounted for. That is, all selections, projections, and joins that may be computed between relations that reside at the same node are determined. The effect of the local processing on the size of the relations and the selectivities of the attributes is estimated. GENERAL (RESPONSE) and GENERAL (TOTAL) use the estimation of the effect of local processing at each node; therefore, the next step after materialization is to determine what processing can be done locally. Then, GENERAL (RESPONSE) or GENERAL (TOTAL) determine the best strategy for executing the query.

For each base relation, $R(i)$, $i = 1, 2, \ldots, n$, the following data are stored in the Data Dictionary/Directory (DD/D).

For each relation, $R(i)$,

| | |
|---|---|
| $n(i)$: | the number of tuples (cardinality), |
| $a(i)$: | the number of attributes (degree), |
| $s(i)$: | the size, $s(i) = n(i) *$ (sum over all $a(i)$ of $w(i,j)$). |

For each attribute, $d(i,j)$, $j = 1, 2, \ldots, a(i)$ of $R(i)$:

| | |
|---|---|
| $v(i,j)$: | the number of possible domain values, |
| $u(i,j)$: | the number of distinct domain values currently held, |
| $w(i,j)$: | the size of one data item in attribute domain (bytes), |
| $h(i,j)$: | the high value of $d(i,j)$ in $u(i,j)$, |
| $l(i,j)$: | the low value $d(i,j)$ in $u(i,j)$. |

The following data can be computed using the above data:

| |
|---|
| $s(i,j) =$ size of all attributes $j$, $= n(i) * w(i,j)$, |

| |
|---|
| $p(i,j) =$ selectivity of attribute $j$, $= u(i,j)/v(i,j)$. |

The selectivity is the number of different values occurring in the attribute divided by the number of all possible values of the attribute. Thus, $0 < p(i,j) < = 1$.

To process the queries represented by the leaf clusters, only the selection, projection, and join operations are needed. For a distributed query, joins on relations that are located at different sites can occur. Before computing these joins, the sizes of the relations are reduced by selections and projections at each site. All joins that can be done locally at each site are performed. The information required for GENERAL (RESPONSE) or GENERAL (TOTAL) for the resulting relations must be computed. This information is:

| | |
|---|---|
| $n(i)$: | the cardinality, |
| $a(i)$: | the number of attributes, |
| $s(i)$: | the size in bytes. |

For each attribute:

| | |
|---|---|
| $p(i,j)$: | the selectivity, |
| $s(i,j)$: | the size in bytes of all of the data items in attribute $d(i,j)$. |

In order to compute this information after a selection, an estimate of the expected fraction of tuples that satisfies a predicate is computed. The method used in MAP is based on a method described in "Access Path Selection in a Relational Database Management System", by P. G. Selinger, M. M. Astrahan, D. D. Chamberlin, R. A. Lorie, and T. G. Price, Proceedings of the ACM SIGMOD Conference, June 1979, which is incorporated herein by reference. satisfies a predicate. For each of the following predicates, the selectivity factor is shown:

```
(1) column = value
    F = 1/u(i,j)
(2) column1 = column2
    F = 1/MAX (u(i,column1), u(i,column2))
(3) column > value
    F = (h(i,column) − value) / (h(i,column) − l(i,column))
      = 0 (if F < 0)
(4) column < value
    F = (value − l(i,column)) / (h(i,column) − l(i,column))
      = 0 (if F < 0)
(5) (pred1) OR (pred2)
    F = F(pred1) + F(pred2) − F(pred1) * F(pred2)
(6) (pred1) AND (pred2)
    F = F(pred1) * F(pred2)
(7) NOT pred
    F = 1 − F(pred)
```

The base relation parameters are changed in the following way for the select:

```
T <− SELECT R WHERE predicate
n(T) = n(R) * F
a(T) = a(R)
s(T) = s(R) * F
For all attributes, j,
v(T,j) = v(R,j)
u(T,j) = u(R,j) * F
w(T,j) = w(R,j)     (size of ONE attribute)
h(T,j) = h(R,j)
```

-continued

```
l(T,j) = l(R,j)
s(T,j) = s(R,j) * F
p(T,j) = p(R,j) * F
```

The base relation parameters are changed in the following way for the project:

```
T <— PROJECT R OVER d(j), . . .
n(T) = n(R)
a(T) = count (d(j), . . .) — the number projected
s(T) = n(T) * (the sum over the attributes projected)
v(T,j) = v(R,j)
u(T,j) = u(R,j)
w(T,j) = w(R,j)
h(T,j) = h(R,j)
l(T,j) = l(R,j)
s(T,j) = s(R,j)
p(T,j) = p(R,j)
```

For a join operation, the selectivity factors are given by the selectivity, p(i,j), of the joining attributes.

For the following join:

```
JOIN R(1), R(2) WHERE R(1).A = R(2).A
F(1) = p(2,A)      and      F(2) = p(1,A)
n(1) = n(1) * F(1)           n(2) = n(2) * F(2)
a(1) = a(1)                  a(2) = a(2)
s(1) = s(1) * F(1)           s(2) = s(2) * F(2)
For the attributes, j:
v(i,j) = v(i,j)
u(i,j) = u(i,j) * F(i)
w(i,j) = w(i,j)
h(i,j) = h(i,j)
l(i,j) = l(i,j)
```

For the new relation that results from the join, the parameters are:

```
if (n(1) > n(2))
  n = n(1)
  s = s(1) + s(2) + (s(2) * ((n(1) − n(2))/n(2))
else
  n = n(2)
  s = s(1) + s(2) + (s(1) * ((n(2) − n(1))/n(1))
a = a(1) + a(2)
```

After local processing is accounted for, GENERAL (RESPONSE) or GENERAL (TOTAL) determines the best way to execute the remaining join operations. The transmission cost of the data is assumed to be the same between any two computer sites and to be a linear function of the size of the data transmitted. To reduce the transmission cost, the amount of data transferred must be reduced. Semi-join operations are used to reduce the amount of data. A semi-join is used to make a relation, which is one of the operands of a join, smaller by deleting tuples that cannot play a role in the join. For example, suppose we want to join relations R and S that are located at two different sites. Two ways to do the join are to ship a copy of R to the site of S or to ship a copy of S to the site of R.

Suppose that the transmission cost, C, is given by:

$$C = Co + X$$

where X is the amount of data transmitted, and Co is the cost of initiating a message. If R and S are of sizes r and s, the cost of the transmission is (where min is a minimum function):

$$C = Co + \min(r,s).$$

Another way to do the join is to project R over the joining attribute and ship the projection to the site of S. At the site of S, we do a natural join of the projection of R and S. The result of the join is shipped back to the site of R where the final join is computed. If the projections of R and S over the joining attributes have sizes r' and s', and the natural join of the projections of R and S with S and R have sizes r'' and s'', then the cost of the transmission is:

$$C = 2Co + \min(r' + s'', s' + r'').$$

This cost may be less than $C = Co + \min(r,s)$.

The best way to perform a join depends on where the result of the join is required. Suppose that the result is required at a third site, other than the site of R or the site of S. Then, in this example, there are five ways to do the join to be considered:

1. The relations R and S are transmitted to the result site, where the join is computed.

2. The relation R is projected over the joining attributes, and the joining attributes are transmitted to the site of S. Relation S is reduced in size by semi-joining S with the joining attributes of R. The relation R and the reduced relation S are transmitted to the result site, where the join is computed.

3. The relation S is projected over the joining attributes, and the joining attributes are transmitted to the site of R. Relation R is reduced in size by semi-joining R with the joining attributes of S. The relation S and the reduced relation R are transmitted to the result site, where the join is computed.

4. The relation R is projected over the joining attributes, and the joining attributes are transmitted to the site of S. Relation S is reduced in size. The reduced relation S is projected over the joining attributes, and the joining attributes are transmitted to the site of R. Relation R is reduced in size. The reduced relations S and R are transmitted to the result site where the join is computed.

5. The relation S is projected over the joining attributes, and the joining attributes are transmitted to the site of R. Relation R is reduced in size. The reduced relation R is projected over the joining attributes, and the joining attributes are transmitted to the site of S. Relation S is reduced in size. The reduced relations R and S are transmitted to the result site where the join is computed.

The data transmissions used for reducing a relation and the transmission of the reduced relation to the result computer site form a schedule for this relation. For example a schedule for relation R(1) follows:

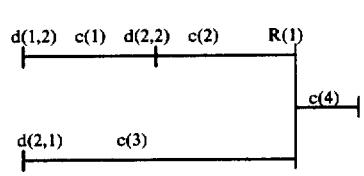

Attribute d(1,2) of relation R(1) is sent to the site of relation R(2), where a semi-join is performed on relation R(2). The cost of transmitting d(1,2) is c(1). The reduced attribute d(2,2) is sent back to the site of relation R(1) at cost c(2) in parallel with d(2,1) at cost c(3). R(1) is joined with d(2,2) and d(2,1) and the final reduced relation, R(1) is sent to the result node at cost c(4).

The selectivity of a joining attribute is used to estimate the change in size of a relation or attribute after a join or semi-join. If relation R(i) has a semi-join with attribute d(k,l) with selectivity p(k,l) on attribute d(i,j), then the size, s(i), of R(i) is changed by:

s(i) = s(i)*p(k,l)

The size, s(i,j) and selectivity, p(i,j), of each joining attribute, j, are changed by:

$$s(i,j) = s(i,j) * p(k,l)$$
and
$$p(i,j) = p(i,j) * p(k,l).$$

The costs are then computed based on the new size. The incoming selectivity of a schedule for a relation is the product of the selectivities of all the attributes in the schedule excluding the attributes of the relation. If there is more than one occurrence of an attribute in a schedule, it can contribute only one instance of its selectivity.

The response time of a schedule is the time elapsed between the start of the first transmission and the time at which the relation arrives at the result site. The total time of a schedule is the sum of the costs of all transmissions required in the schedule. For the above example, the response time, R, and the total time, T, are given by:

$$R = \max(c(1)+c(2)+c(4), c(3)+c(4)) \text{ and}$$

$$T = c(1)+c(2)+c(3)+c(4).$$

The output of GENERAL (RESPONSE) or GENERAL (TOTAL) is a distribution strategy for a query. This strategy consists of the schedules for all relations in the query that do not reside at the result node. The final step in MAP is to translate the schedules to a canonical query representation that includes all local processing, move requests, and final processing at the result site. This query representation is the final execution strategy that is split up and distributed to the sites involved in the execution.

Figure 8:
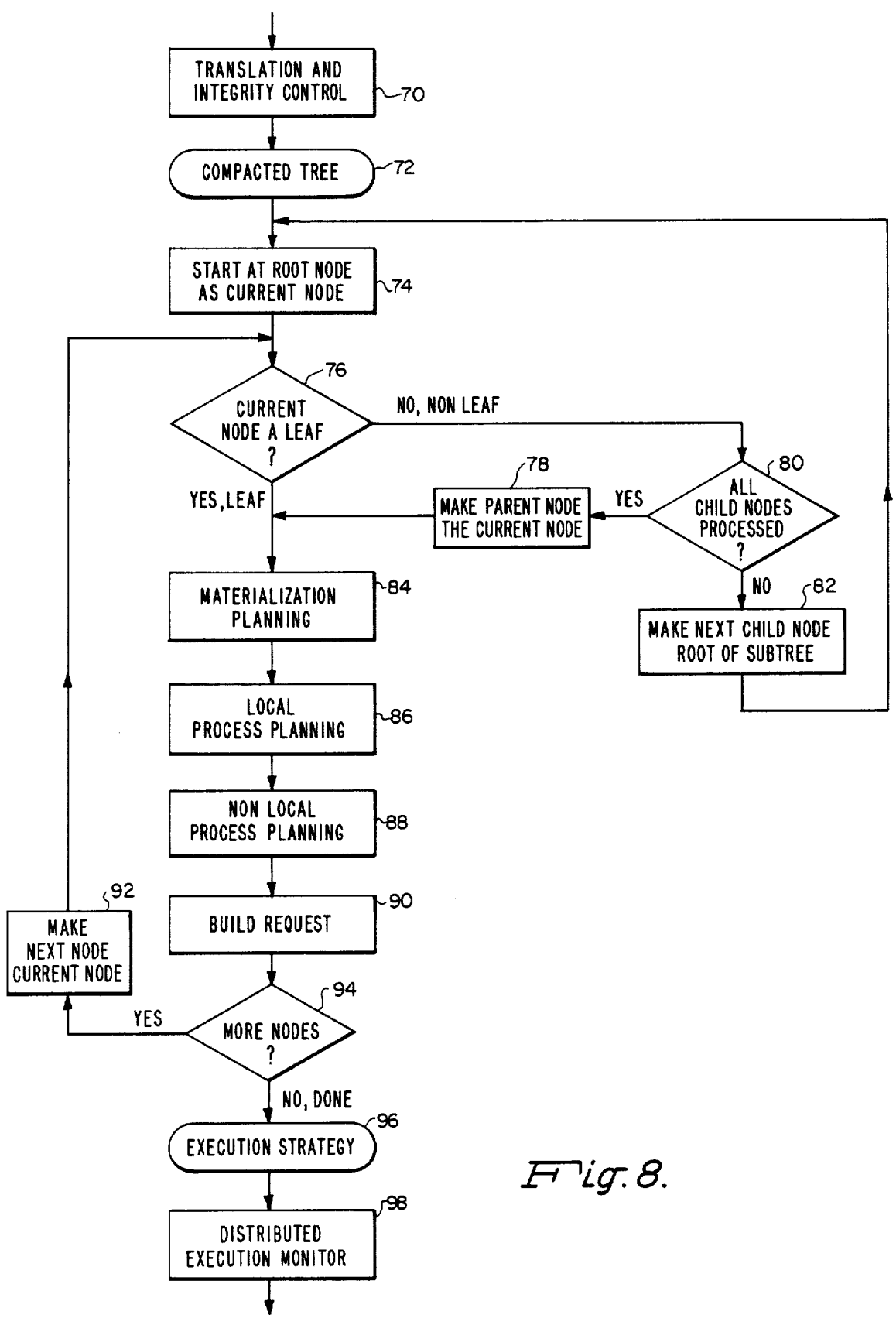
FIG. 8 is a flow diagram of the optimization method of the present invention.

The following section contains a detailed description of the MAP process. See FIG. 8.

MAP Process

1. Build execution strategies

For each cluster tree 72 in the list of trees input by Translation and Integrity Control 70, (each tree corresponds to a GORDAS query or update) build an execution strategy, using BUILD REQUESTS process.

2. Add print commands

Add commands to print the result at the result application processor (AP). For queries, keep track of where the final result is built (the result DP), and the temporary relation containing the result. Add move commands to the strategies that move the temporary relations to the result AP and print commands to print the temporary relation at the result AP.

BUILD REQUESTS Process

1. Build an execution strategy for a tree starting at the root node 74. Decision block 76 checks whether or not the current mode is a leaf.

a. Root is a leaf. If the root of the cluster tree is a leaf, build a strategy using OPTIMIZE CLUSTER Process.

b. Root is not a leaf. Decision block 80 checks whether or not all child nodes are processed. If so, then block 78 makes the parent mode the current mode and build a strategy using OPTIMIZE CLUSTER process. If not, then block 82 makes the next child node the root of subtree and apply BUILD REQUESTS process. Decision block 94 checks if there are more nodes. If so, then block 92 makes the next node the current node and apply BUILD REQUESTS. If there are no more nodes, pass the execution strategy 96 to the distributed execution monitor 98. Keep track of all final relations and result DPs. If the root cluster represents a set operation, choose a DP that has the most operands, and add a set command to the execution strategies. If the root cluster represents an update, add move commands of the final relations to all sites containing the relation to be updated. Add an update command for each site.

OPTIMIZE CLUSTER Process

1. Materialization.

In materialization planning 84, choose a site for each base relation in the variable list of the cluster and a result DP using MATERIALIZATION process.

2. Add local processing commands.

In local process planning 86, generate the commands in the execution strategy for all initial local processing. This includes SELECT using any condition, PROJECT over only the attributes in the final result or needed to do JOINs, and JOIN any relations at the same site that can be joined.

3. Perform access planning. The first step in non local process planning 88 and build request 90 in access planning.

a. GENERAL (RESPONSE) or GENERAL (TOTAL).

If optimization method required is GENERAL (RESPONSE) process or GENERAL (TOTAL) process, calculate the sizes and selectivities of the relations resulting after local processing, and apply GENERAL (RESPONSE) or GENERAL (TOTAL) process. Build the commands in the execution strategy for each schedule generated. Do not add redundant commands.

b. IFS.

No optimization is performed.

4. Add commands for final processing at the result DP. The second step in non local process planning 88 and build requests 90 is the commands for processing at the result DP.

a. GENERAL (RESPONSE) or GENERAL (TOTAL).

For GENERAL (RESPONSE) or GENERAL (TOTAL) process, add a move to the result DP of each temporary relation in the execution strategy that corresponds to the final relation built in the schedule. Each temporary relation corresponds to one or more of the original base relations, that resulted after local processing. Build the commands to generate the final result at the result DP.

b. IFS.

For IFS process, add a move to the result DP of each temporary relation in the execution strategy that corresponds to the relation built after the initial local processing. Each temporary relation corresponds to one or more of the original base relations. Build the commands to generate the final result at the result DP.

MATERIALIZATION Process

1. Choose a materialization for the base relations.

While a site has not been chosen for each base relation variable, choose the site that has the most number of relations. Associate this site with the relations that reside at it.

2. Choose a result data processor.

The result DP is the site chosen the most often. If the result AP site has a DP and there is a tie involving this DP, choose this DP.

GENERAL (RESPONSE) or GENERAL (TOTAL) Process

A query is "simple" if after initial local processing, the relations contain only one joining attribute, PARALLEL process computes minimum response time schedules for simple queries, and SERIAL process computes minimum total time schedules for simple queries.

In a "general" query, the relations can contain more than one joining attribute; therefore, such a relation can be reduced in size by semi-joins on different joining attributes. GENERAL (RESPONSE) process computes minimum response time schedules for general queries using RESPONSE process, and GENERAL (TOTAL) computes minimum total time schedules for general queries using TOTAL process.

1. Generate candidate relation schedules.

Isolate each of the joining attributes, and consider each to define a simple query with an undefined result node.

a. GENERAL (RESPONSE).

To minimize response time, apply PARALLEL process to each simple query. Save all candidate schedules for integration in step 2 below.

b. GENERAL (TOTAL).

To minimize total time, apply SERIAL process to each simple query. This results in one schedule per simple query. From these schedules, the candidate schedules for each joining attribute are extracted. For attribute $d(i,j)$, its candidate schedule is identical to the schedule produced by SERIAL, applied to the simple query in which $d(i,j)$ occurs, up to the transmission of $d(i,j)$. All transmissions after $d(i,j)$ are deleted.

2. Integrate the candidate schedules.

For each relation $R(i)$, that is not at the result node, the candidate schedules are integrated to form a schedule for $R(i)$. To minimize response time, apply RESPONSE process. To minimize total time, apply TOTAL process.

PARALLEL PROCESS

1. Order relations.

Order relations $R(i)$ such that $s(1)<=s(2)<= \ldots s(n)$. $R(i)$ consists of one attribute.

2. Select best schedule.

Consider each relation $R(i)$ in ascending order of size. For each relation $R(j)$, $j<i$, construct a schedule to $R(i)$ that consists of the parallel transmission of the schedule of relation $R(j)$ and all schedules of relations $R(k)$, $k<j$. Select the schedule with minimum response time.

SERIAL PROCESS

1. Order relations.

Order relations $R(i)$ such that $s(1)<=s(2)<= \ldots s(n)$. $R(i)$ consists of one attribute.

2. Select best schedule.

If no relations are at the result node, then select the strategy:

$$R(1) \rightarrow R(2) \rightarrow \ldots R(n) \rightarrow \text{result node}.$$

If $R(r)$ is at the result node, then there are two strategies. Select the one with the minimum response time:

$$R(1) \rightarrow R(2) \rightarrow \ldots R(r) \rightarrow \ldots R(n) \rightarrow R(r) \text{ and}$$

$$R(1) \rightarrow R(2) \rightarrow \ldots R(r-1) \rightarrow R(r+1) \rightarrow \ldots R(n) \rightarrow R(r).$$

RESPONSE PROCESS

1. Order candidate schedules.

For each relation $R(i)$, order the candidate schedules on the joining attributes in $R(i)$, $d(i,j)$, in ascending order of arrival time.

2. Integrate schedules.

For each candidate schedule for $R(i)$, $CSCH(1)$, in ascending order, construct an integrated schedule that consists of the parallel transmission $CSCH(1)$ and all $CSCH(k)$ where $k<1$. Select the integrated schedule with minimum response time.

TOTAL PROCESS

1. Generate additional candidate schedules.

For each relation $R(i)$ and each candidate schedule $CSCH(1)$, if $CSCH(1)$ contains a transmission of a joining attribute of $R(i)$, $d(i,j)$, then add an additional candidate schedule for $R(i)$ that is the same as $CSCH(1)$ except that the transmission of $d(i,j)$ is deleted.

2. Select the best candidate schedule.

For each relation $R(i)$ and for each joining attribute $d(i,j)$, select the candidate schedule, $BEST(i,j)$, that minimizes total time for transmitting $R(i)$ if only the joining attributes are considered which can be joined with $d(i,j)$.

3. Order candidate schedules.

For each relation $R(i)$, order the schedules $BEST(i,j)$ on joining attributes $d(i,j)$ of $R(i)$, in ascending order of arrival time.

4. Integrate schedules.

For each $BEST(i,j)$ in ascending order, construct an integrated schedule for $R(i)$ that consists of the parallel transmission of $BEST(i,j)$ and all $BEST(i,k)$ where $k<j$. Select the integrated schedule with minimum total time.

Materialization and Access Planning Program Modules

The following sections present the details of the higher level program modules (procedures) of the preferred embodiment which perform the materialization and access planning function. These higher level program modules are: MAP, BUILD_REQUESTS, OPTIMIZE_CLUSTER, LOCAL_PROCESSING, GENERAL, and BUILD_REQUESTS_TABLE. These sections describe the function, inputs and outputs of each program module as well as presenting the modules procedure in a program design notation known as "P-Notation", which is part of the WELLMADE methodology, which is described in "The WELLMADE System Design Methodology", Honeywell Corporate Computer Science Center, October 1979, which is incorporated herein by reference.

MAP Procedure

Functional Description

Determine an optimal execution strategy for a given query, update, or transaction on a distributed database management system. The execution strategy is determined by trying to minimize communication costs.

```
Static Design
procedure map (
    in:     first_cluster: cluster_ptr,
            result_ap: node_id,
            opt_Type: map_optimization_choices;
    out:    block_table: block_ptr,
            error: error_code
);
Permanent Data
None
Local Data
    cl_prt: pointer to cluster_list;
    req_table: request array;
    final_temp: relation_name;
    result_dp: node_id;
```

Input Specifications
Background

A conjunctive query is one that can be expressed using only select, project, and join operators with AND in the WHERE clause. The retrieve statement in QUEL and the SELECT-FROM-WHERE statement in SEQUEL yield conjunctive queries whenever the WHERE clauses are the logical and of terms that equate two components of tuples of equate a component to a constant.

It is possible to find the optimal query equivalent to a conjunctive query. Assuming that selections and projections should be done as early as possible, then only the order in which the joins are done need be considered. Processes that optimize this type of query take advantage of the fact that the joins commute with each other. The query does not have to be represented by a tree, but can be represented by a linear structure:

a list of variables in the query.
a condition to be applied to the variables.
a list of attributes to be projected over for the result.

For a relationally complete language, the only operators needed are selection, projection, join, union, and difference. An intersection can be implemented using a join. In order to allow the logical OR in a condition, the UNION operator must be included. In system R*, the operators selection, projection, join, and union are handled. A compacted tree is used to represent a query. A tree must be used since the union and join operators do not commute over each other. To include difference is even harder, since the difference operator does not commute among other difference operators in general. A compacted tree contains clusters of operators. Each cluster is a non-procedural (unordered) grouping of the same binary operator.

In DDS, the input to MAP consists of a tree compacted into a cluster tree or cluster. Each cluster can then be optimized independently. For GORDAS queries with only logical AND in the condition, one cluster is created. The output of Translation and Integrity Control (TIC) procedure is a compacted tree as described. The set operators supported will be UNION, INTERSECTION, and DIFFERENCE. The update operators will be DELETE, MODIFY, and INSERT. The leaf nodes in a compacted tree will represent the SELECT, PROJECT, JOIN portion of the total query. Each leaf has a variable list of the base relations involved, a condition on the bases, and a list of attributes to project for the result.

The input to this procedure consists of three things. The first is a list of cluster roots. Each root is a root of a cluster tree that represents a GORDAS query or update. More than one root is needed for a GORDAS transaction. Each root is optimized independently in this version. A cluster tree represents a compacted tree of a query or update.

The second input is a node identifier of the application processor. The third is the type of optimization: IFS, GENERAL (RESPONSE) or GENERAL (TOTAL).

Output Specification

The output consists of a block table that is used by the DEM to send the relational algebra commands to all LEMs chosen.

Procedural Design
Procedural Description

For each root in the list input, build the relational algebra requests for the query or update. Add a move of the final temporary built in a query to the result AP and print it there. To build the output of MAP for DEM, get the dataflow relationships among the requests and build the integer command list and the block table.

```
P-Notation
error := FALSE;
initialize_req_table (out: req_table, error);
if (not error)
    cl_ptr := first_cluster;
    do (cl_ptr = NULL) and (not error)
        build_requests (in: cl_ptr->cluster_root, result_ap,
            opt_type, req_table; out: req_table, final_temp,
            result_dp, error)
        if (final_temp = "") and (not error)
            add_move (in: req_table, final_temp, result_dp,
                result_ap; out: req_table, error);
            if (not error)
                add_print (in: req_table, final_temp,
                    result_ap; out: req_table, error);
                (error)
                    skip;
            fi;
            (error)
                skip;
        fi;
        cl_ptr := cl_ptr->next_root;
    od;
    if (not error)
        dataflow (in: req_table; out: req_table, error);
        if (not error)
            build_command_list (in: req_table;
                out: block_ptr, error);
            (error)
                skip;
        fi;
        (error)
            skip;
    fi;
    free clusters;
```

BUILD_REQUESTS Procedure

Functional Description

Build the requests in the requests table for a given query using the optimization process input.

```
Static Design
procedure build_requests
    in: cl_root: pointer to cluster,
        result_ap: node_id,
        opt_type: map_optimization_choices,
        req_table: request array;
```

-continued is performed at each node containing the base relation to be updated.

```
P-Notation
error = FALSE;
if (cl__root   = NULL)
    if (tag (cl__leaf) = BASE) { leaf }
        optimize__cluster (in: cl__root, result__ap, opt__type, req__table;
                           out: final__temp, req__table, result__dp, error);
    | (otherwise) {UNION, INTERSECT, DIFFERENCE, DELETE, INSERT,
                   MODIFY}
        var = cl__root−>cl__var;
        temp__info__list = NULL;
        do (var   = NULL) and (not error)
            build__requests (in: var, result__ap, opt__type, req__table;
                             out: req__table, temp, dp, error);
            if (not error)
                add__to__list (in: temp__info__list, temp, dp;
                               out: temp__info__list, error);
            | (error)
                skip;
            fi;
            var := var−>next__var;
        od;
        if (tag (cl__root) = UNION) or (tag (cl__root) = INTERSECT) or
           (tag (cl__root) = DIFFERENCE)
           ( and (not error))
                pick__dp (in: temp__info__list, result__ap; out: dp, error);
                if (not error)
                    add__set__ops (in: temp__info__list, dp, req__table,
                        tag (cl__root); out: req__table, error);
                | (error)
                skip;
                fi;
        | ((tag (cl__root) = DELETE) or (tag (cl__root) = INSERT) or
           (tag (cl__root) = MODIFY)) and (not error)
                add__update__ops (in: temp__info__list, req__table, tag (cl__root),
                    cl__root−>update__cluster; out: req__table, error);
        | (otherwise)
        skip;
        fi;
    fi;
fi
```

```
    out: req__table: request array,
         final__temp: relation__name,
         result__dp: node__id,
         error: error__code;
);
Permanent Data
    None
Local Data
    temp__info__list: temp__dp;
    var: cluster;
    temp: relation__name;
    dp: node__id;
```

Input Specifications

The input to this procedure consists of three things. The first is the root of a compacted tree for the given query or update. The second is the node identifier of the application processor. The third is the type of optimization.

Output Specification

The output consists of the requests for this cluster tree in the requests table in the form of the relational algebra. The final temporary that is created for a query is also output. An error code of TRUE or FALSE is set.

Procedural Design

Procedural Description

Process the cluster tree input. If the root input is a leaf node, optimize the cluster using the process indicated. If the root is a non-leaf, this procedure is called recursively for each child. If the node is a set operation, the operation is created in the request table to be performed using each child at the data processor chosen the most. If the node is an update operation, the update

OPTIMIZE−CLUSTER Procedure

Functional Description

Build the relational algebra requests for a leaf cluster in a compacted tree. The materialization and building of the query tree are accomplished.

```
Static Design
procedure optimize__cluster (
    in: cl__leaf: cluster,
        result__ap: node__id,
        opt__type: map__optimization__choices,
        req__table: request array;
    out: final__temp: relation__name,
        req__table: request array,
        result__dp: node__id;
        error: error__code
);
Permanent Data
    Temp__rel__table: abstract; { table in data dictionary }
Local Data
    rel__info: rel__info__ptr;
```

Input Specifications

The input to this procedure consists of four things. The first is the cluster that we are currently processing. It must be of type BASE, that is, a leaf. The second is the result application processor. The third is the optimization type. The fourth is the requests table to which requests for this cluster are appended.

Output Specification

The output consists of the name of the temporary that is created as a result of this cluster. The output also consists of the requests added to the requests table to realize the command represented in the cluster, and the result data processor where the final temporary is created.

Procedural Design
Procedural Description

Determine a materialization and result DP for the cluster. The sites chosen in the materialization are stored in the cluster base variable structures. Build the relation information table used in optimization process GENERAL and in building the relational algebra requests. The local processing is taken into account when this is built. If the optimization process is GENERAL, build the schedules for the relations. Build the requests table from the relation information table local processing information and the schedules built by GENERAL.

```
P-Notation
error := FALSE;
{ set the base sites in the cluster }
materialization (in: cl__lear—>bases, result__ap;
                 out: cl__lear—>bases, result__dp, error);
if (not error)
  local__processing (in: cl__leaf; out:rel__info, error);
  if (not error)
    if (opt__type = GENERAL RESPONSE) or (opt__type =
    General__TOTAL)
       general (in: cl__leaf, result__dp, result__ap, rel__info;
                out: rel__info, error);
    | (otherwise)
    skip;
    fi;
    { don't do anything for IFS }
    if (not error)
       build__requests__table (in: rel__info, cl__leaf, req__table,
       result__dp;
                       out: final__temp, req__table, error);
    | (error)
       skip;
    fi;
    free rel__info;
    | (error)
    skip;
  fi;
  | (error)
  skip;
fi;
```

LOCAL_PROCESSING Procedure

Functional Description
Initialize the relation information list. Include the processing that can be done at one site, i.e., the local processing.

```
Static Design
procedure local__processing (
    in:   cl__leaf: pointer to cluster;
    out:  rel__info: rel__info__ptr,
          error: error__code;
);
Permanent Data
None
Local Data
None
```

Input Specifications
The input to this procedure consists of one thing. It is the cluster that is currently being processed. It must be of type BASE, i.e., a leaf.

Output Specification
The output is the list of relation information records. The size and selectivity fields have been set based on the condition. Base relations that reside at the same node have been joined if they have a joining attribute in common.

Procedural Design
Procedural Description

Create a relation information record for each base relation variable in the cluster. For each variable in the cluster, calculate the selectivity factor using the selection condition. Compute the selectivity factor using the necessary data in the data dictionary/directory. For each base relation, the following data are stored in the data dictionary/directory: For each relation, R(i), $n(i)$: the number of tuples (cardinality),
$a(i)$: the number of attributes (degree),
$s(i)$: size,
$s(i) = n(i) *$ (sum over all $a(i)$ of $w(i,j)$)

For each attribute, $d(i,j)$, $j = 1, \ldots, a(i)$ of R(i):

$v(i,j)$: the number of possible domain values,
$u(i,j)$: the number of distinct domain values currently held
$w(i,j)$: the size of ONE data item in attribute domain (bytes)
$h(i,j)$: the high value of $u(i,j)$
$l(i,j)$: the low value of $u(i,j)$ The following data can be computed using the above data:

$s(i,j) =$ size of all attributes j,
$\phantom{s(i,j)} = n(i) * w(i,j)$
$p(i,j) =$ selectivity of attribute j,
$\phantom{p(i,j)} = u(i,j)/v(i,j)$ For a SELECTION operation, the selectivity factor is determined by the methode described by the Selinger, Astrahan, et al reference mentioned above by the condition in the following way:

(1) column = value
    $F = 1/u(i,j)$
(2) column1 = column2
    $F = 1/\text{MAX}(u(i,\text{column}1), u(i,\text{column}2))$
(3) column > value
    $F = (h(i,\text{column}) - \text{value}) / h(i,\text{column}) - l(i,\text{column}))$
    $= 0$ (if $F < 0$)
(4) column < value
    $F = (\text{value} - l(i,\text{column})) / (h(i,\text{column}) - l(i,\text{column}))$
    $= 0$ (if $F < 0$)
(5) (pred1) OR (pred2)
    $F = F(\text{pred}1) + F(\text{pred}2) - F(\text{pred}1) * F(\text{pred}2)$
(6) (pred1) AND (pred2)
    $F = F(\text{pred}1) * F(\text{pred}2)$
(7) NOT pred
    $F = 1 - F(\text{pred})$ The base relation parameters are changed in the following way for the select:

T <— SELECT R WHERE predicate
    $n(T) = n(R) * F$
    $a(T) = a(R)$
    $s(T) = s(R) * F$
    $v(T,j) = v(R, j)$
    $u(T,j) = u(R,j) * F$
    $w(T,j) = w(R,j)$ (recall size of ONE attribute)

-continued
```
h(T,j) = h(R,j)
l(T,j) = l(R,j)
s(T,j) = s(R,j) * F
p(T,j) = p(R,j) * F
```

The selectivity factor is used to reduce the size of relations and attributes after operations are performed on them. The selectivity factor is the expected fraction of tuples that satisfies a predicate.

For a PROJECTION operation, each data element in the data dictionary/directory is changed in the following way:

```
T <— PROJECT R over d(j), . . .
    n(T) = n(R)
    a(T) = count (d(j)) — the number projected
    s(T) = n(T) * (the sum over the attributes projected)
    v(T,j) = v(R, j)
    u(T,j) = u(R,j)
    w(T,j) = w(R,j)
    h(T,j) = h(R,j)
    l(T,j) = l(R,j)
    s(T,j) = s(R,j)
    p(T,j) = p(R,j)
```

Set the size and cardinality of the base relation using the selectivity factor. Add the joining attributes to each relation, setting the size and selectivity of each joining attribute. Combine the relation information records of base relations that are located at the same node and can be joined. Multiply the size and cardinality of the relations by the selectivity of the relation being joined to. Similarly, multiply the size and selectivity of each joining attribute by this same selectivity. For a JOIN operation, the selectivity factors are given by the selectivity, $p(i,j)$, of the joining attributes.

For the following join:

```
JOIN R(1), R(2) where R(1).A = R(2).A
F(1) = P(2,A)          and     F(2) = P(1,A)
n(1) = n(1) * F(1)             n(2) = n(2) * F(2)
a(1) = a(1)                    a(2) = a(2)
s(1) = s(1) * F(1)             s(2) = s(2) * F(2)
For the attributes:
v(i,A) = v(i,A)
u(i,A) = u(i,A) * F(i)
w(i,A) = w(i,A)
h(i,A) = h(i,A)
l(i,A) = l(i,A)
```

For the new relation that results from the join, the parameters are:

```
if (n(1) > n(2))
    n = n(1)
    s = s(1) + s(2) + (s(2) * ((n(1) − n(2))/n(2))
else
    n = n(2)
    s = s(1) + s(2) + (s(1) * ((n(2) − n(1))/n(1))
a = a(1) + a(2)
P-Notation
error := FALSE;
if tag(cl_leaf) = BASE
    error := TRUE;
tag(cl_leaf) = BASE
    rel_info_create  (in: cl_leaf→base_cluster;
                      out: re_info, error);
    if (not error)
        join_bases_at_same_node (in: rel_info;
                      out: rel_info, error);
    (error)
        skip;
    fi;
fi;
```

GENERAL Procedure

Functional Description

Determine the optimal execution strategy for a query represented by a leaf cluster. This process will minimize either response time or total time using the method described by the Apers, Hevner and Yao reference mentioned above.

```
Static Design
procedure general (
        in:     cl_leaf: cluster_ptr,
                opt_type: map_optimization_choices,
                result_dp: node_id,
                result_ap: node_id,
                rel_info: rel_info_ptr;
        out:    rel_info: rel_info_ptr,
                error: error_code
);
Permanent Data
        Total_number_of_joining_attrs: integer;
Local Data
        ja: integer;
        temp_relp: rel_info_ptr;
```

Input Specifications

The input to this procedure consists of five things. The first is the cluster to be optimized. It must be of type BASE, i.e., a leaf. The second is the map optimization type. The third is the result data processor determined by the materialization process. The fourth is the result application processor. The fifth is the relation information list after all local processing has been determined.

Output Specification

The output consists of the schedule determined for each relation. An error code of TRUE or FALSE is returned.

Procedural Design

Procedural Description

The best schedule based on response or total time for each joining attribute in the relation information list is determined. The optimal schedule for each relation is built using the attribute schedules.

```
P-Notation
    error := FALSE;
    ja := 0;
    do (ja < Total_number_of_joining_attrs )
    and (not error)
        if (opt_type = GENERAL_RESPONSE)
            parallel (in: rel_info, ja; out: rel_info, error);
            (opt_type = GENERAL_TOTAL)
            serial   (in: rel_info, result_dp, ja;
                      out: rel_info, error);
        fi;
        ja := ja + 1;
    od;
    if (not error)
        temp_relp := rel_info;
        do (temp_relp = NULL) and (not error)
            if (opt_type = GENERAL_RESPONSE)
                response (in: rel_info, temp_relp, result_dp;
                          out: temp_relp, error);
                (opt_type = GENERAL_TOTAL)
                total   (in: rel_info, temp_relp, result_dp;
                          out: temp_relp, error);
```

```
                                    -continued
        fi;
        temp_relp := temp_relp→next_rel;
    od;
    (error)
    skip;
fi;
```

BUILD_REQUESTS_TABLE Procedure

Functional Description

Build the relational algebra requests for a cluster of type BASE using the relation information list and the schedules built during optimization.

```
Static Design
procedure build_requests_table (
    in:     rel_info: rel_info_ptr,
            cl_base: pointer to base_cluster,
            req_table: abstract,
    out:    result_dp: node_id,
            opt_type: map_optimization_choices;
            final_temp: relation_name,
            req_table: abstract,
            error: error_code;
);
Permanent Data
None
Local Data
None
```

Input Specifications

The input to this procedure consists of five things. The first is a pointer to the relation information list after all local processing and schedules have been determined. The second is the base cluster that is currently being processed. The third is the requests table to which the requests should be appended. The fourth is the result data processor. The fifth is the type of query optimization process.

Output Specification

The output is the final temporary relation that is created. The updated requests table is also output.

Procedural Design

Procedural Description

Create the requests to do the local processing. For GENERAL, build the requests for the schedules. For IFS, don't do anything. Add moves to the result data processor for each temp created in the relation information list. Get the final answer at the result data processor.

```
P-Notation
    error := FALSE;
    generate_local_requests   (in: rel_info, cl_base, req_table;
                                out: req_table, error);
    if (not error)
        if (opt_type = GENERAL_RESPONSE) or (GENERAL_TOTAL)
            build_rel_ops_for_schedules   (in: rel_info, req_table;
                                            out: req_table, error);
            (opt type = IFS)
            trelp := rel_info;
            do (trelp  = NULL)
                trelp→final_temp_rel := trelp→temp_rel;
                trelp := trelp→next_rel;
            od;
        fi;
        if (not error)
            get_final_result   (in: rel_info, cl_base→projects, result_dp,
                                    req_table; out:req_table, final_temp, error);
            (error)
            skip;
        fi;
        (error)
        skip;
    fi;
```

Query Processing Example

The method by which a user query is processed by the above program modules is shown in the following example user query. The numbers in parentheses after the program module names indicate the level of recursion in the calling of the program modules.

User query:
get <<Firstname,Salary>> of EMPLOYEE where Lastname="Smith" or Name of department="Accounting":

| Program Module | Action |
| --- | --- |
| TIC | parse and translate query producing one cluster tree, C1 |

-continued

| Program Module | Action |
|---|---|

```
                    C1
                    ↓
              ┌───────────┐
              │   UNION   │
              └───────────┘
               ↓         ↓
```

| V = EMPLOYEE<br>C = Lastname = 'Smith'<br>P = Firstname,Salary | V = EMPLOYEE, DEPARTMENT<br>C = DName = 'Accounting' and<br>    EMPLOYEE.D# = DEPARTMENT<br>P = Firstname,Salary |

| Program Module | Action |
|---|---|
| | result_ap = 4 (user site) |
| | opt_type = GENERAL RESPONSE |
| MAP | requests_table is initialized.<br>C1 is passed to BUILD_REQUESTS. |
| BUILD_REQUESTS(1) | first child is passed to BUILD_REQUESTS. |

| V = EMPLOYEE |
| C = Lastname = 'Smith' |
| P = Firstname, Salary |

| Program Module | Action |
|---|---|
| BUILD_REQUESTS(2) | first child is passed to OPTIMIZE_CLUSTER |
| OPTIMIZE_CLUSTER | Materialization is chosen for EMPLOYEE at site 1,<br>result_dp = site 1.<br>first child is passed to LOCAL_PROCESSING. |
| LOCAL_PROCESSING | Local processing is determined:<br>All operations can be performed locally.<br>Return to OPTIMIZE_CLUSTER. |
| OPTIMIZE_CLUSTER | BUILD_REQUESTS_TABLE is called. |
| BUILD_REQUESTS_TABLE | Requests are appended to requests_table.<br>Return to OPTIMIZE_CLUSTER. |
| site | requests-table: |
| 1 | T1 ←—— Select EMPLOYEE where<br>Lastname = 'Smith' |
| 1 | T2 ←—— Project EMPLOYEE over<br>Firstname, Salary |
| OPTIMIZE_CLUSTER | Return to BUILD_REQUESTS(2). |
| BUILD_REQUESTS(2) | Return to BUILD_REQUESTS(1). |
| BUILD_REQUESTS(1) | Keep track of T2 at site 1 in temp-info-list.<br>second-child is passed to BUILD_REQUESTS. |

| V = EMPLOYEE, DEPARTMENT |
| C = DName = 'Accounting' and |
|     EMPLOYEE D# |
| P = Firstname, Salary |

| Program Module | Action |
|---|---|
| BUILD_REQUESTS(3) | second child is passed to OPTIMIZE_CLUSTER. |
| OPTIMIZE_CLUSTER | Materialization is chosen - EMPLOYEE at site 1,<br>DEPARTMENT at site 2; result-dp = site 2.<br>LOCAL_PROCESSING is called. |
| LOCAL_PROCESSING | Local processing is determined.<br>Select all EMPLOYEES at site 1 and<br>select 'Accounting' DEPARTMENTS at site 2,<br>Project needed attributes.<br>Affect of select and project operations on<br>size and selectivity is computed.<br>Return to OPTIMIZE_CLUSTER. |
| OPTIMIZE_CLUSTER | GENERAL is called. |
| GENERAL | PARALLEL and RESPONSE are called.<br>They use size and selectivity values<br>estimated in local processing to produce<br>two schedules (one for each relation).<br>Assume that the schedules are to use a semi-join to<br>reduce EMPLOYEE relation and to use<br>DEPARTMENT relation as is.<br>Return to OPTIMIZE_CLUSTER. |

Schedules

| Program Module | Action |
|---|---|
| OPTIMIZE_CLUSTER | BUILD_REQUESTS_TABLE is called. |
| BUILD_REQUESTS_TABLE | Requests are appended to requests_table. Return to OPTIMIZE_CLUSTER. |

DEPARTMENT: Dept. D#
EMPLOYEE: Dept. D# EMPLOYEE

| Site | Requests-table: |
|---|---|
| 1 | T1 <— Select EMPLOYEE where Lastname = 'Smith' |
| 1 | T2 <— Project T1 over Firstname, Salary |
| 2 | T3 <— Select DEPARTMENT where Dname = 'Accounting' |
| 2 | T4 <— Project T3 over D# |
| 2 | Move T4 to site 1 |
| 1 | T5 <— Select EMPLOYEE |
| 1 | T6 <— Join T4, T5 over D# |
| 1 | T7 <— Project T6 over Firstname, Salary |
| 1 | Move T7 to site 2 |
| OPTIMIZE_CLUSTER | Return to BUILD_REQUESTS(3) |
| BUILD_REQUESTS(3) | Return to BUILD_REQUESTS(1) |
| BUILD_REQUESTS(1) | Keep track of T7 at site 2 in temp-info-list. PICK-DP chooses site 1 for union operation. ADD-SET-OPS adds union to requests_table. Return to: MAP. (new ones added) |
| 1 | -ADD_MOVE and ADD_PRINT are called. |
| 1 | Move T8 to site 4 |
| 4 | print T8 |
|  | -DATAFLOW is called to generate dataflow dependencies. -BUILD_COMMAND_LIST formats the message information needed by DEM. Final output to DEM based on requests-table (logically equivalent). |

Example of Optimization for Response Time or Total Time

In the following example, which illustrates optimization for response time or total time, the relational database is used to keep track of PARTS, SUPPLIERS, PARTS ON-ORDER by SUPPLIERS, and JOBS requiring PARTS from SUPPLIERS. It consists of the following relations:

PARTS (P#, PNAME)
SUPPLIERS (S#, SNAME)
ON-ORDER (S#, P#, QTY)
S-P-J (S#, P#, J#)

Suppose that PARTS and SUPPLIERS are located at site 1, ON-ORDER at site 2, S-P-J at site 3, and the result is required at site 4. The following cluster tree, T, that contains one leaf node, represents the query:
List the P#, PNAME, S# for all parts that are currently on order from suppliers who supply that part to job 50.

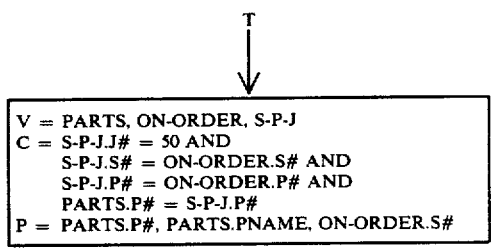

V = PARTS, ON-ORDER, S-P-J
C = S-P-J.J# = 50 AND
    S-P-J.S# = ON-ORDER.S# AND
    S-P-J.P# = ON-ORDER.P# AND
    PARTS.P# = S-P-J.P#
P = PARTS.P#, PARTS.PNAME, ON-ORDER.S#

The local processing consists of performing the selection on S-P-J where S-P-J.J# = 50, and the projections of the required attributes in all relations. The resulting size and selectivity parameters of the new relations are:

| Relation R(i): | Size S(i) | d(i,1)=P# | | d(i,2)=S# | |
|---|---|---|---|---|---|
| | | s(i,1) | p(i,1) | s(i,2) | p(i,2) |
| R(1): ON-ORDER | 10000 | 1000 | 0.4 | 500 | 0.3 |
| R(2): S-P-J | 15000 | 1000 | 0.5 | 1500 | 0.8 |
| R(3): PARTS | 20000 | 2000 | 0.7 | — | — |

The Initial Feasible Solution (IFS) is to transmit all relations after local processing to the result node, where the result is built. Assuming the cost function is $C(X) = 20 + X$ where X is the size of the data transmitted in bytes, the schedules for this solution are:

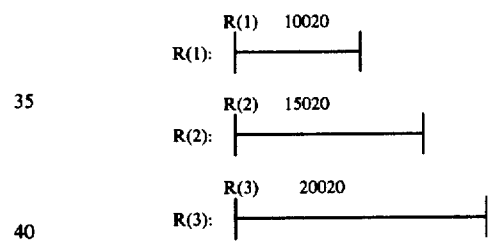

Response time = 20020 Total time = 45060 sing, and final processing at the result node for this set of schedules is:

| site | request |
|---|---|
| 1 | T1 <— PROJECT PARTS OVER PARTS.P#, PARTS.PNAME |
| 1 | MOVE T1 TO 4 |
| 2 | T2 <— PROJECT ON-ORDER OVER ON-ORDER.S#, ON-ORDER.P# |
| 2 | MOVE T2 TO 4 |
| 3 | T3 <— SELECT S-P-J WHERE S-P-J.J# = 50 |
| 3 | T4 <— PROJECT T3 OVER T3.S#, T3.P# |
| 3 | MOVE T4 TO 4 |
| 4 | T5 <— JOIN T2, T4 WHERE T2.S# = T4.S# AND T2.P# = T4.P# |
| 4 | T6 <— JOIN T5, T1 WHERE T5.P# = T1.P# |
| 4 | RESULT <— PROJECT T6 OVER T6.P#, T6.PNAME, T6.S# |

To find the minimum response time schedule, GENERAL (RESPONSE) is used. After the initial local processing, two simple queries are formed, one having P# and the other having S# as common joining attributes. PARALLEL process is applied to each simple query.
For P#, the resulting candidate schedules generated are:

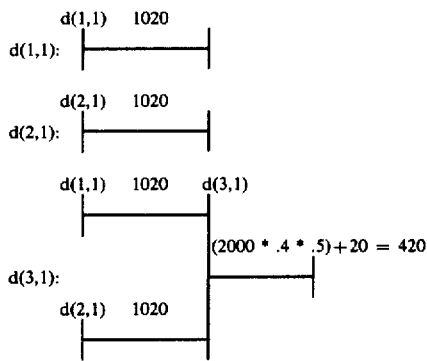

For S#, the resulting candidate schedules generated are:

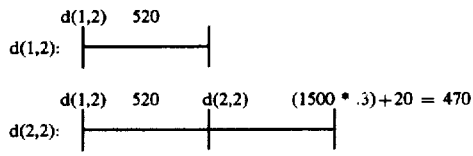

Now schedules for R(1), R(2), and R(3) are constructed. For R(1), the schedules of attributes that can be applied to R(1) are ordered on their arrival time at R(1):

| Attribute | Arrival Time |
| --- | --- |
| d(2,2) | 990 |
| d(2,1) | 1020 |
| d(3,1) | 1440 |

For each of these three attributes, an integrated schedule for R(1) is constructed that consists of the parallel transmission of all attributes having an arrival time less than or equal to its own arrival time:

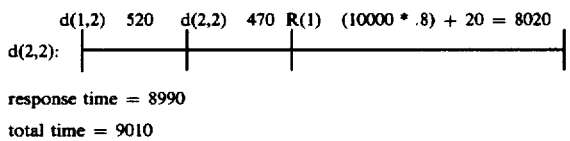

response time = 8990
total time = 9010

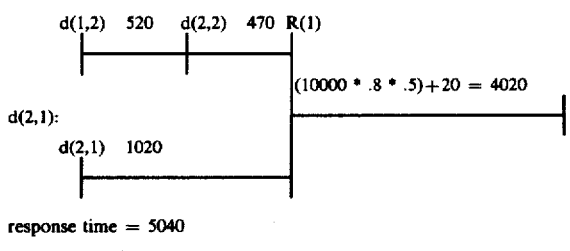

response time = 5040
total time = 6030

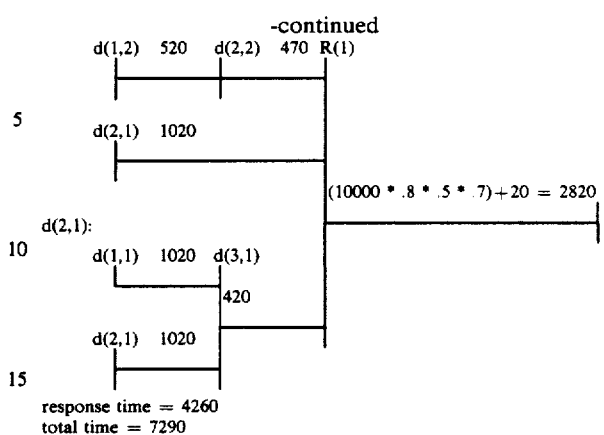

response time = 4260
total time = 7290

From these 3 schedules and the IFS for R(1), the schedule with the minimum response time of 4260 is chosen.

For R(2), the arrival times for applicable attributes are:

| Attribute | Arrival Time |
| --- | --- |
| d(1,2) | 520 |
| d(1,1) | 1020 |
| d(3,1) | 1440 |

The following candidate schedules are built:

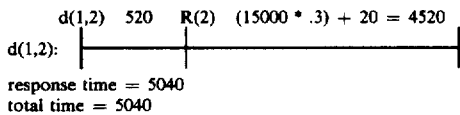

response time = 5040
total time = 5040

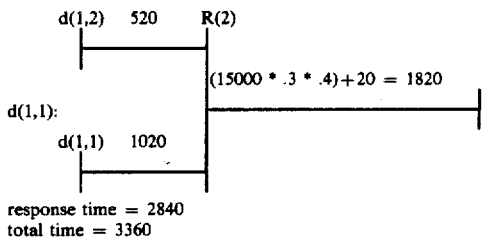

response time = 2840
total time = 3360

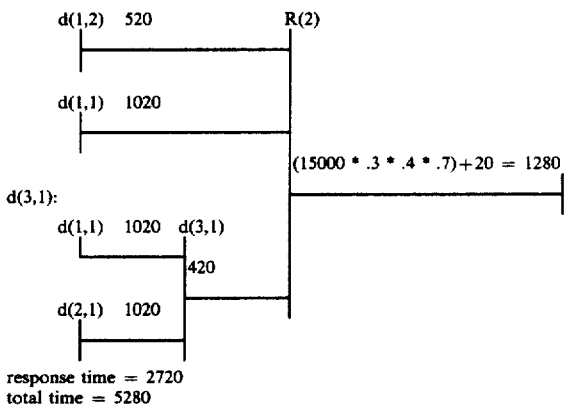

response time = 2720
total time = 5280

The schedule with response time 2720 is chosen. For R(3), the arrival times for applicable attributes are:

| Attribute | Arrival Time |
| --- | --- |
| d(1,1) | 1020 |

| Attribute | Arrival Time |
|---|---|
| d(2,1) | 1020 |

The following candidate schedules are built:

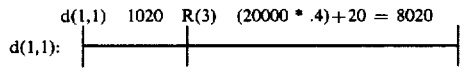

response time = 9040
total time = 9040

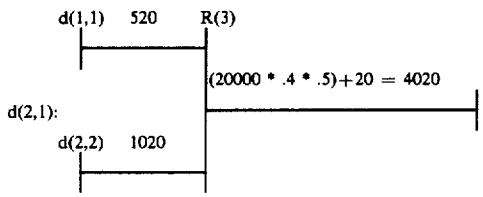

response time = 5040
total time = 6060

The schedule with response time 5040 is chosen. For the example query, the response time is 5040 and the total time is 18630.

To find the minimum total time schedule, GENERAL (TOTAL) is used. The SERIAL process is applied to each simple query. For P#, the resulting candidate schedules are:

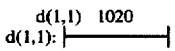

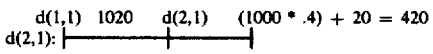

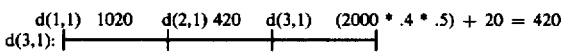

For S#,

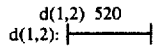

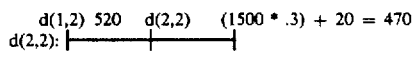

Now schedules for R(1), R(2), and R(3) are constructed. For R(1), two schedules are added for P#:

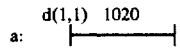

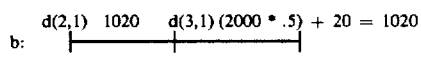

Now the best candidate schedule, BEST(1,1) is chosen. The first schedule, d(1,1) is meaningless. The candidates are:

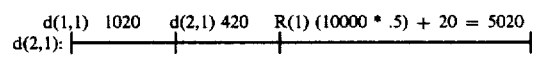

total time = 6460
response time = 6460

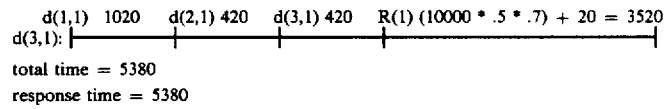

total time = 5380
response time = 5380

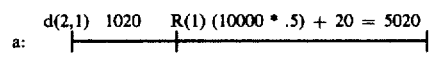

total time = 6040
response time = 6040

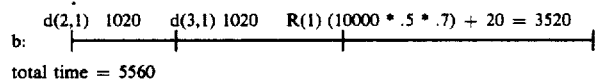

total time = 5560
response time = 5560

BEST (1,1) = d(3,1) with a total time of 5380. For S#, one schedule is added:

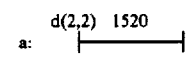

Now, BEST(1,2) is chosen. The candidates are:

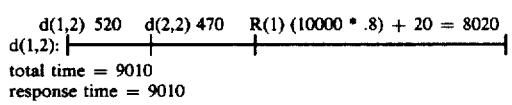

total time = 9010
response time = 9010

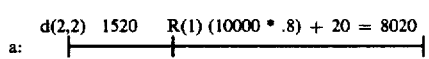

total time = 9540
response time = 9540

BEST(2,1) = d(1,2) with a total time of 9010. Now BEST(1,1) and BEST(1,2) are ordered on their total time, and the following two schedules are generated:

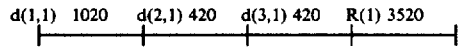

total time = 5380
response time = 5380

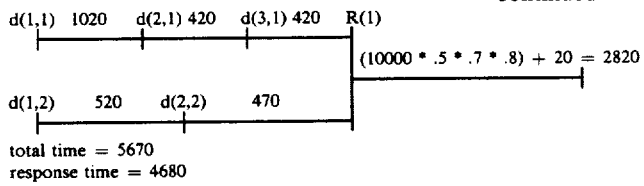

```
d(1,1) 1020   d(2,1) 420   d(3,1) 420   R(1)
├──────────┼────────────┼────────────┤
                                      │(10000 * .5 * .7 * .8) + 20 = 2820
                                      ├─────────────────────────────────┤ d(1,2)  520   d(2,2)  470
├──────────┼────────────┤
 total time = 5670
 response time = 4680
```

The first is chosen as the final schedule for R(1). For R(2), one schedule is added for P#:

```
    d(1,1) 1020   d(3,1)   (2000 * .4) + 20 = 820
a:  ├──────────┼──────────────────────────────────┤
```

The candidates for BEST(2,1) are:

```
          d(1,1) 1020    R(2) (15000 * .4) + 20 = 6020
d(1,1): ├──────────┼─────────────────────────────────┤
total time = 7040
response time = 7040 d(1,1) 1020   d(2,1) 420   d(3,1) 420   R(2)  (15000 * .4 * .7) + 20 = 4220
d(3,1): ├──────────┼────────────┼────────────┼──────────────────────────────────────┤
total time = 6080
response time = 6080 d(1,1) 1020   d(3,1) 820   R(2) (15000 * .4 * .7) + 20 = 4220
a:  ├──────────┼────────────┼──────────────────────────────────┤
total time = 6060
response time = 6060
```

BEST(2,1)= with a total time of 6060. For S#, no schedules are added. The only candidate for BEST(2,2) is:

```
         d(1,2)  520   R(2) (15000 * .3) + 20 = 4520
d(1,2): ├──────────┼──────────────────────────────────┤
total time = 5040
response time = 5040
```

BEST(2,1) and BEST(2,2) are ordered on their total time, and the following two schedules are generated:

```
d(1,2)  520    R(2) 4520
├──────────┼──────────────┤
total time = 5040
response time =5040
```

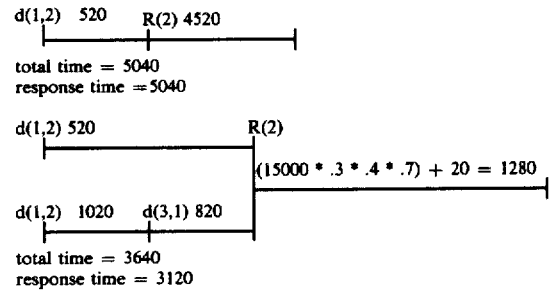

```
d(1,2) 520                R(2)
├────────────────────────────┤
                             │(15000 * .3 * .4 * .7) + 20 = 1280
                             ├─────────────────────────────────┤
d(1,2) 1020   d(3,1) 820
├──────────┼──────────────┤
total time = 3640
response time = 3120
```

The second is chosen as the final schedule for R(2). For R(3), no schedules are added for P#. The candidates for BEST(3,1) are:

```
          d(1,1) 1020    R(3) (20000 * .4) + 20 = 8020
d(1,1): ├──────────┼─────────────────────────────────┤
total time = 9040
response time = 9040 d(1,1) 1020   d(2,1) 420   R(3) (20000 * .4 * .5) + 20 = 4020
d(2,1): ├──────────┼────────────┼─────────────────────────────────────┤
total time 5460
response time = 5460
```

BEST(3,1)=d(2,1) with a total time of 5460.

Since this is the only joining attribute, the second is the final schedule for R(3).

The total time is 14480, and the response time is 5460.

Both the total time and response time for the schedules generated from GENERAL (RESPONSE) and GENERAL (TOTAL) are much better than the IFS.

From the above discussion, it can be appreciated that the optimization method of the present invention partitions optimization into global and local optimization. The method provides that global optimization is done by selecting the sites from which data is to be accessed from and transmitted to, and determining where the accessed.ata is to be processed. Once this global optimization is performed and the execution strategy is determined, the Distributed Execution Monitor (DEM) oversees the distribution of the execution commands to the Local Execution Monitors (LEM) at the local sites. The LEM then passes on these execution commands to the Local Operation Module (LOM) which can then perform any desired local optimization using local data base parameters to optimize accessing their individual local databases. Because there may be multiple LEMs involved, this local optimization may be done in parallel at multiple sites, with each site optimizing its own local processing. This may result in starting the execution of the query sooner because the total elapsed optimization time is decreased. Further, a local site can begin execution of its portion of a query once it completes its local optimization processing, thus possibly further speeding up the completion of the query execution. Having the local optimization performed at the local sites also results in eliminating having to distribute local site parameters throughout the network to all sites which might perform optimization and further allows for local optimization to be done using local parameters which may be more current.

DDS Performance

In this selection, the performance of DDS and the MAP methods of the preferred embodiment are discussed based upon the experimental results. The experimental results are summarized below:

(1) The elapsed real time spent in MAP is negligible compared to the time spent in distributed compilation and execution. The time spent in DEM is at least 98% of the response time. The time in DEM increases rapidly as the size of relations, number of relations, and number of attributes per relation accessed increases, due to increases in local execution time, execution time communications costs, and compile time communication costs. Local compile time is relatively constant.

(2) In DDS, transactions are compiled and the execution strategies saved for later execution. If the cost of compiling a transaction is negligible compared to the cost of executing the transaction, it may be desirable to use MAP processes that are more dynamic and balance workloads. Both the cost of compiling and the cost of executing a query are complex functions of the size of relations, number of relations, number of attributes per relation accessed, and the distribution of relations. For the same distribution, the cost of executing a query increases much more rapidly with the size of relations accessed than the cost of compiling a query, and therefore the dynamic MAP processes may be desirable for large sizes of relations accessed. Both the costs of compiling and executing a query increases rapidly with the number of relations and/or number of attributes per relation. The effect on communications time is much greater when the AP and DP are on geographically separate computers.

(3) The load and capacity of the site processors (i.e., computer) are very important to overall performance. For some queries, it is more efficient to use a DP physically located on a different processor than the same processor as the AP. As the size and/or number of relations accessed increases, the communications costs increase and negate this effect. The configuration of the processors (e.g., the existence of cache memory) influences the performance of DDS by making one DP superior to another.

(4) There is a constant overhead associated with each query. Its magnitude depends on the processor configuration and load.

One area for performance improvement is DDS tuning. DDS tuning involves further identification of the DDS bottlenecks and improvement of DDS software in an effort to increase the performance of DDS. Software modifications that would result in improvements to DDS performance based on the initial preferred embodiment results are:

(1) Modify the cost functions used by MAP process to be the actual communications costs functions measured. Modify MAP so that it doesn't assume that the cost of sending a message from A to B is the same as sending a message from B to A. Use the cost functions in the process of choosing a result DP, so that the MAP materialization process does not assume that it costs the same to send a message of the same size from any DP to any AP.

(2) Extend MAP to include local processing costs during both the materialization and access planning phases. Information about the configuration and loads of the DPs should be included.

System and database parameter variation experimentation may lead to further performance improvement. The following experiments are suggested:

(1) Evaluate the MAP processes in a geographically distributed DBMS. The performance benefits of the sophisticated MAP processes (GENERAL (RESPONSE), and GENERAL (TOTAL)) should be evident in this environment that includes long distance communications and large databases. This environment can provide performance data for a wide range of database parameters.

(2) Evaluate the MAP processes in a locally distributed DBMS. This environment provides a third set of system parameters. The need for this type of MAP process is apparent from the initial DDS results, and will probably become much more important and necessary in an LAN environment with high speed communications.

Another area of possible improvement includes the extension of the MAP cost function to include local execution costs and to do dynamic load balancing. The MAP process will need information about the local system configurations and loads. Some information, such as, the existence of cache memory, can be used at compile time. The load information is dynamic and a dynamic materialization process will be necessary. Further research into dynamic MAP processes, and MAP processes that perform access planning before materialization may also result in improved performance. The later process provides the ability to do access planning at compile time and materialization at run time.

While the invention has been shown and described with reference to the preferred embodiment thereof, it will be understood by those skilled in the art that the above and other changes in form and detail may be made therein without departing from the spirit and scope of the invention.

What is claimed is:

1. A machine implemented method for automatically determining an optimal execution strategy for a request comprising query, update or transaction operations on a distributed database system having a plurality of data site, with each site having a computer and data storage facility, and said sites are interconnected by communication lines, said machine implemented method comprising the steps of:

A. inputting an ad hoc relational query or update request from a first computer process that formulates the relational query or update request as a compacted tree having lead nodes that are select, project or join operators and non-leaf nodes that are union, intersection, difference, delete, modify or insert operators to a second computer process which thereafter performs step B;

B. for each node in the compacted tree perform the following starting at the root node:
 1. if the current node is a leaf node perform the following:
   a. materialization planning to choose the data sites from which data is to be accessed;
   b. local process planning to determine which operations can be processed locally at each site determined by materialization planning and estimate parameters of resultant data from the local operations;
   c. non-local process planning to determine strategy for remaining operations which can not be performed locally without transmission of data between sites;
   d. execution strategy building to build an execution strategy for each data site in the distributed database system at which data is processed by access or manipulation;
 2. if the current node is a non-leaf node perform the following:

a. for each child node make the child a root of a subtree and perform step 1 above for the subtree; and b. having processed all child nodes of the current non-leaf node perform the following for the current non-leaf node:

1. materialization planning to choose the data sites from which data is to be accessed;

2. local process planning to determine which operations can be processed locally at each site determined by materialization planning and estimate parameters of resultant data from the local operations;

3. non-local process planning to determine strategy for remaining operations which can not be performed locally without transmisson of data between sites;

4. execution strategy building to build an execution strategy for each data site in the distributed database system at which data is processed by access or manipulation; and then C. outputting execution strategy commands from said second computer process to a third computer process that coordinates the execution of the execution strategy commands at sites within the distributed database system.

2. The method of claim 1 wherein the step of materialization planning for a leaf node comprises the steps of:

A. choosing a site for each base relation that is an operand of the leaf node by choosing the sites that have the most number of base relations; and B. choosing result data processor, a site where the final result of the operations will be built, by choosing the site that has the most number of base relations.

3. The method of claim 1 wherein the step of local process planning for a leaf node comprises the steps of:

A. determining the select, project and join operations that can be performed on base relations or temporary relations that reside at the same node; and B. estimating parameters of temporary relations produced by select, project and join operators using the parameter of the base relations.

4. The method of claim 1 wherein the step of non-local process planning for a leaf node further comprises determining a strategy for performing the remaining join operators by transmission of base relations and temporary relations among the sites by an optimization criteria using the parameters of the temporary relations estimated by local process planning and the parameters of the base relations.

5. The method of claim 4 wherein the optimization criteria is to minimize the total time for communications among the sites.

6. The method of claim 5 wherein the communication time between sites is a function of the size parameter of the data to be transmitted.

7. The method of claim 6 wherein the size parameter is reduced by use of semi join operations on the base relations or temporary relations.

8. The method of claim 7 wherein the reduction of the size parameter by use of the semi join operations is estimated by use of selectivity parameters.

9. The method of claim 4 wherein the optimization criteria is to minimize the response time for communication among the sites.

10. The method of claim 9 wherein the communication time between sites is a function of the size parameter of the data to be transmitted.

11. The method of claim 10 wherein the size parameter is reduced by use of semi join operations on the base relations or temporary relations.

12. The method of claim 11 wherein the reduction of the size parameter by use of the semi join operations is estimated by use of selectivity parameters.

13. The method of claim 4 wherein the optimization criteria is to ignore the parameters and to have all base relations and temporary relations transmitted to the result data processor chosen by materialization planning and perform remaining operators at the result data processor.

14. The method of claim 1 wherein the step of building for a leaf node further comprises the step of building select, project, join and move requests resulting from the local process planning and non-local process planning steps.

15. The method of claim 1 wherein the step of materialization planning for a non-leaf node comprises the steps of:

A. determining a site for each temporary relation that is an operand of a non-leaf node based upon the result data processor chosen for each child node;

B. for a union, intersection or difference operator, choosing a result data processor, a site where the final result of the operations will be built, by choosing the site that has the most number of temporary relations; and C. for a delete, modify or insert operator, determining all sites where the base relation to be updated resides.

16. The method of claim 1 wherein the step of local process planning for a non-leaf node comprises the steps of:

A. determining union, intersection or difference operations that can be performed on temporary relations that reside at the same node; and B. determining delete, modify or insert operations that can be performed on base relations that reside at the same node as the temporary relations.

17. The method of claim 1 wherein the step of non-local process planning for a non-leaf node comprises the steps of:

A. for a union, intersection or difference operator, transmitting all temporary relations to the result data processor chosen by materialization planning and perform the remaining operations at the result data processor; and B. for a delete, modify or insert operator, transmitting all temporary relations to the sites where the base relation to be updated resides as determined by materialization planning and performing the delete, modify or insert operation at those sites.

18. The method of claim 1 wherein the step of execution strategy building for a non-leaf node further comprises the step of building union, intersection, difference, delete, modify, insert and move requests resulting from the local process planning and non-local process planning steps.

* * * * *